(12) United States Patent
Aoai

(10) Patent No.: US 7,690,301 B2
(45) Date of Patent: Apr. 6, 2010

(54) INK COMPOSITION, INKJET RECORDING METHOD, PRINTED MATERIAL, PRODUCTION METHOD OF A PLANOGRAPHIC PRINTING PLATE AND PLANOGRAPHIC PRINTING PLATE

(75) Inventor: Toshiaki Aoai, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 368 days.

(21) Appl. No.: 11/349,277

(22) Filed: Feb. 8, 2006

(65) Prior Publication Data

US 2006/0174799 A1 Aug. 10, 2006

(30) Foreign Application Priority Data

Feb. 8, 2005 (JP) ............................ 2005-032291

(51) Int. Cl.
*C09D 11/10* (2006.01)
*B41N 1/00* (2006.01)
*B05D 1/40* (2006.01)
*B41M 5/50* (2006.01)

(52) U.S. Cl. .................... 101/453; 427/466; 428/195.1; 522/31; 522/168; 522/75; 522/83; 523/160

(58) Field of Classification Search ................. 427/466; 522/25, 31, 168, 170, 181, 75, 83; 428/209, 428/195.1; 523/160; 101/453
See application file for complete search history.

(56) References Cited

U.S. PATENT DOCUMENTS 6,187,380 B1 * 2/2001 Hallman et al. ............. 427/261

| 6,959,986 | B2 * | 11/2005 | Ushirogouchi et al. ...... 347/100 |
| 7,244,473 | B2 * | 7/2007 | Takabayashi et al. ....... 427/466 |
| 2004/0244641 | A1 | 12/2004 | Takabayashi et al. |

FOREIGN PATENT DOCUMENTS

| EP | 1 357 159 A2 | 10/2003 |
| EP | 1 528 088 A1 | 5/2005 |
| JP | 63-235382 A | 9/1988 |
| JP | 3-216379 A | 9/1991 |
| JP | 5-214280 A | 8/1993 |
| JP | 6-21256 B2 | 3/1994 |
| JP | 6-62905 B2 | 8/1994 |
| JP | 9-183928 A | 7/1997 |
| JP | 2003-192943 A | 7/2003 |
| JP | 2003-192944 A | 7/2003 |
| JP | 2003-312121 A | 11/2003 |
| JP | 2003-341217 A | 12/2003 |
| JP | 2004-91558 A | 3/2004 |

\* cited by examiner

*Primary Examiner*—Susan W Berman
(74) *Attorney, Agent, or Firm*—Sughrue Mion, PLLC

(57) ABSTRACT

An ink composition including a cationically polymerizable compound (a), a compound (b) that generates acid by irradiation with a radiation ray, and a basic compound (c) that becomes less basic by irradiation with a radiation ray. Also, an inkjet recording method and a printed material using the ink composition, as well as a planographic printing plate obtained by using the ink composition and a method of producing the planographic printing plate are disclosed.

28 Claims, No Drawings

INK COMPOSITION, INKJET RECORDING METHOD, PRINTED MATERIAL, PRODUCTION METHOD OF A PLANOGRAPHIC PRINTING PLATE AND PLANOGRAPHIC PRINTING PLATE

CROSS-REFERENCE TO RELATED APPLICATION

This application claims priority under 35 USC 119 from Japanese Patent Application No. 2005-032291, the disclosure of which is incorporated by reference herein.

BACKGROUND OF THE INVENTION

1. Field of the Invention

The present invention relates to an ink composition which is favorably used for inkjet recording; an inkjet recording method; and a printed material using the same. Further, the present invention relates to a planographic printing plate obtained by using the ink composition and a method of producing the planographic printing plate. Specifically, the present invention relates to an ink composition which is suitable for inkjet recording, which is curable with a high sensitivity to a radiation ray, and which is capable of forming a high quality image in inkjet recording and is superior in storage stability; an inkjet recording method; a printed material using the same; a planographic printing plate obtained by using the ink composition; and a method of producing the planographic printing plate.

2. Description of the Related Art

As image recording methods for forming an image on a recording medium such as paper based on image data signals, there are an electrophotographic method, a sublimation or fusion heat-transfer method, an inkjet method and the like. Among them, the inkjet method can be carried out using an inexpensive device, wherein the image is directly formed by ejecting an ink only on a necessary image region on the recording medium. Therefore, the ink can be efficiently used and the running cost is low. In addition, the inkjet method generates little noise and is superior as an image recording method.

The inkjet method allows printing not only on plain paper but also on a non-water absorptive recording medium such as a plastic sheet or a metal plate. However, higher speed and higher image quality at the time of printing are important issues, and the period needed for drying and hardening an ink droplet after ejection has a great influence on the printing efficiency and the quality of a printed image.

As one of such inkjet recording methods, there is a method using an inkjet recording ink which is curable by irradiation with a radiation ray. In this method, it is possible to improve the printing efficiency and form a sharp image, by hardening the ink droplet by irradiating it with a radiation ray immediately or after a given period from ejection.

If it is possible to raise the sensitivity of such an inkjet recording ink which is curable by irradiation with a radiation ray such as ultraviolet light and to thereby raise the efficiency of the ink hardening by the radiation ray, many benefits such as improvement in inkjet recording efficiency, reduction of power consumption, elongation of the lifetime of a radiation ray generator due to decrease in the load thereon, and prevention of evaporation of low-molecular substances due to insufficient hardening can be obtained. In addition, the improvement in sensitivity is effective in increasing the strength of the image formed with the inkjet recording ink, and in particular, when the ink composition is applied to preparation of planographic printing plates, it leads to an increase in the hardness of the image region and thus to an increase in printing durability.

Such an inkjet method using an ink composition which is curable by a radiation ray such as ultraviolet light has attracted attention recently, as the ink composition is relatively odorless and fast-drying and allows recording on a recording medium having less ink absorbency, and ultraviolet light curable ink compositions for inkjet, which are curable by radical polymerization, have been disclosed (see, for example, Japanese Patent Application Laid-Open (JP-A) Nos. 63-235382, 3-216379, and 5-214280, and Japanese Patent Application Publication (JP-B) Nos. 6-21256 and 6-62905). In addition, for the purpose of providing an inkjet recording ink that gives an image higher in sensitivity and adhesiveness to the recording medium without ink bleeding, even on a recording medium on which it is normally difficult to record directly by the inkjet recording method, and that is higher in stability with less skin irritation or sensitization, compositions containing polymerizable compounds of particular radically polymerizable acrylates and a colorant have been proposed (see, for example, JP-A Nos. 2003-192943 and 2003-192944). These radically polymerizable inks are superior in hardening speed and give an image without ink bleeding, but they have a disadvantage in that the adhesiveness to a recording medium deteriorates due to volume shrinkage during hardening.

Accordingly, for the purpose of improving the adhesiveness to a recording medium, cationically polymerizable ink compositions resistant to shrinkage during ultraviolet hardening have been proposed (see, for example, JP-A No. 9-183928). However, these cationically polymerizable inks have insufficient stability during storage because of the reaction of acids generated therein over time, which is a great obstacle for commercialization of these inks. For improvement in the storage stability, methods of adding a basic compound or a thermal base-generating agent have been proposed (see, for example, JP-A Nos. 2003-312121, 2003-341217 and 2004-91558), but these results in the emergence of a new problem in that the hardening efficiency of the ink is lowered by the basic compound, because it inhibits the function of the acid generated by light exposure. Thus, there exists a need for improvement in both storage stability and sensitivity.

SUMMARY OF THE INVENTION

The present invention has been made in consideration of the above needs. That is, the present invention provides an inkjet recording ink composition which is curable with high sensitivity to a radiation ray, is capable of forming a high-quality image, and is superior in adhesiveness to a recording medium and storage stability, and an inkjet recording method using the ink composition. The invention also provides a printed material and a planographic printing plate obtained by using the ink composition which is superior in storage stability and is curable at high sensitivity to an ultraviolet ray, and a method of producing the planographic printing plate.

In a first aspect, the present invention provides an ink composition comprising a cationically polymerizable compound (a), a compound (b) that generates acid by irradiation with a radiation ray, and a basic compound (c) that becomes less basic by irradiation with a radiation ray.

In a second aspect, the present invention provides the ink composition described in the first aspect, wherein the basic compound (c) that becomes less basic by irradiation with a radiation ray is one or more onium salt compound selected from OH or carboxylate salts of sulfonium, iodonium, or ammonium.

In a third aspect, the present invention provides the ink composition described in the first or second aspect, wherein the basic compound (c) that becomes less basic by irradiation with a radiation ray is a compound represented by Formula (I), (II), (III), or (IV):

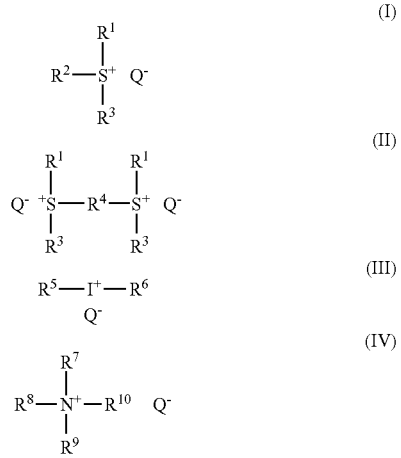

wherein, $R^1$ to $R^3$ and $R^5$ to $R^{10}$ each independently represent an alkyl, cycloalkyl, aralkyl, or aryl group that may be substituted additionally; and $R^4$ represents an alkylene, cycloalkylene, or arylene group that may be substituted additionally; $Q^-$ represents $OH^-$, an aliphatic carboxylate anion, or an aromatic carboxylate anion; and any two of $R^1$ to $R^3$ in Formula (I), $R^1$ and $R^3$ in Formula (II), $R^5$ and $R^6$ in Formula (III), or any two of $R^7$ to $R^{10}$ in Formula (IV) may bond with each other to form a ring.

In a fourth aspect, the present invention provides the ink composition described in any one of the first to third aspects, wherein the compound (b) that generates acid by irradiation with a radiation ray is a compound having a sulfonium or iodonium structure that is the same as a sulfonium or iodonium structure of the basic compound (c) that becomes less basic by irradiation with a radiation ray.

In a fifth aspect, the present invention provides the ink composition described in the first aspect, wherein the cationically polymerizable compound (a) is one or more compound selected from the group consisting of epoxy compounds, vinyl ether compounds, and oxetane compounds.

In a sixth aspect, the present invention provides the ink composition described in the fifth aspect, wherein the cationically polymerizable compound (a) is a combination of at least one compound selected from the group consisting of epoxy and oxetane compounds and a vinyl ether compound.

In a seventh aspect, the present invention provides the ink composition described in the first aspect, wherein the content of the basic compound (c) is 0.001 to 10 wt % based on the total solid content of the ink composition.

In an eighth aspect, the present invention provides the ink composition described in the first aspect, wherein the content of the compound (b) that generates an acid by irradiation with a radiation ray is 0.1 to 20 wt % based on the total solid content of the ink composition.

In a ninth aspect, the present invention provides the ink composition described in the first aspect, wherein the content of the cationically polymerizable compound (a) is 10 to 95 wt % based on the total solid content of the composition.

In a tenth aspect, the present invention provides the ink composition described in the first aspect, further comprising a colorant (d).

In an eleventh aspect, the present invention provides the ink composition described in the tenth aspect, wherein the colorant (d) is a pigment or oil soluble dye.

In a twelfth aspect, the present invention provides the ink composition described in the first aspect, wherein the ink composition is for use in inkjet recording.

In a thirteenth aspect, the present invention provides an inkjet recording method, comprising: printing on a recording medium with the ink composition described in any one of the first to eleventh aspects by an inkjet printer and hardening the printed ink composition by irradiation with a radiation ray.

In a fourteenth aspect, the present invention provides a printed material formed by printing an image on a recording medium with the ink composition described in any one of the first to eleventh aspects by an inkjet printer and then hardening the ink composition by irradiation with a radiation ray.

In a fifteenth aspect, the present invention provides a method of producing a planographic printing plate comprising: ejecting the ink composition described in any one of the first to eleventh aspects onto a hydrophilic support, and hardening the ink composition by irradiation with a radiation ray to thereby form a hydrophobic region thereon.

In a sixteenth aspect, the present invention provides a planographic printing plate comprising a hydrophobic region formed by ejecting the ink composition described in any one of the first to eleventh aspects onto a hydrophilic support and hardening the ink by irradiation with a radiation ray.

DETAILED DESCRIPTION OF THE INVENTION

Hereinafter, the present invention will be described in detail.

The ink composition according to the invention, which is curable by irradiation with a radiation ray, comprises a cationically polymerizable compound (a), an acid generator (b) and a particular additive (c), and a colorant (d) as needed.

The term "a radiation ray" used in the invention is not particularly limited if it provides energy to the ink composition to generate polymerization initiating radical by irradiation; examples thereof include α ray, γ ray, X-ray, ultraviolet light, visible light, electron beam, and the like; and among them, ultraviolet light and electron beam are preferable and ultraviolet light is particularly preferable, from the viewpoints of curing sensitivity and availability of equipment. Thus, the ink composition according to the invention is preferably an ink composition which is curable by irradiation of an ultraviolet light as a radiation ray.

Hereinafter, the respective components in the ink composition according to the invention will be described.

[Basic Compound (c) that Becomes Less Basic by Irradiation with a Radiation Ray]

The basic compound (c) that becomes less basic by irradiation with a radiation ray (hereinafter, referred to as specific base component (c)), is one of essential components in the invention. The specific base component (c) refers to a compound that is basic originally in the ink composition and loses its basicity owing to decomposition by irradiation with a radiation ray. Compounds having such a property are disclosed in JP-A Nos. 6-11835, 6-266100, 7-238196, and 10-111570. However, the inventors have newly found that it is possible to provide the ink composition for inkjet with both improved storage stability and high sensitivity by using one of the compounds in the ink composition.

The specific base component (c) is a basic compound that becomes less basic or loses its basicity upon irradiation with a radiation ray, and favorable examples of the component include the OH or carboxylate salts of sulfonium compounds, the OH or carboxylate salts of iodonium compounds, the OH or carboxylate salts of ammonium compounds, and the like. Typical examples thereof include the compounds represented by Formulae (I) to (IV).

$$R^2-\overset{R^1}{\underset{R^3}{\overset{|}{S^+}}}-Q^- \quad (I)$$

$$Q^- \ ^+S-\overset{R^1}{\underset{R^3}{\overset{|}{|}}}-R^4-\overset{R^1}{\underset{R^3}{\overset{|}{S^+}}}\ Q^- \quad (II)$$

$$R^5-I^+-R^6 \quad (III)$$
$$Q^-$$

$$R^8-\overset{R^7}{\underset{R^9}{\overset{|}{N^+}}}-R^{10}\ Q^- \quad (IV)$$

In Formulae (I) to (IV), $R^1$ to $R^3$ and $R^5$ to $R^{10}$ each independently represent an alkyl, cycloalkyl, aralkyl, or aryl group and $R^4$ represents an alkylene, cycloalkylene, or arylene group. $Q^-$ represents $OH^-$, an aliphatic carboxylate anion, or an aromatic carboxylate anion. Any two groups of $R^1$ to $R^3$ in Formula (I), $R^1$ and $R^3$ in Formula (II), $R^5$ and $R^6$ in Formula (III), or any two of $R^7$ to $R^{10}$ in Formula (IV) may bind to each other to form a ring.

The compounds represented by Formulas (I) and (II) will be described first. In Formula (I) or (II), $R^1$ to $R^3$ each independently represent an alkyl, cycloalkyl, aralkyl, or aryl group that may be substituted additionally. Any two groups of $R^1$ to $R^3$ may bind to each other to form a ring.

$R^1$ to $R^3$ each preferably represent a cycloalkyl or aryl group and more preferably an aryl group.

When each of $R^1$ to $R^3$ is an aryl group, the aryl group may have at least one substituent. Examples of the substituents include, for example, a linear, branched or cyclic alkyl group, a linear, branched or cyclic alkoxy group, a hydroxy group, a halogen atom, —S—$R^0$, or the like, wherein $R^0$ represents a linear, branched or cyclic alkyl group or an aryl group having 6 to 14 carbon atoms such as phenyl, tolyl, methoxyphenyl, and naphthyl group.

Examples of the alkyl groups include those having 1 to 4 carbon atoms such as methyl, ethyl, propyl, n-butyl, sec-butyl, and t-butyl group. Examples of the cyclic alkyl groups include those having 3 to 8 carbon atoms such as cyclopropyl, cyclopentyl, and cyclohexyl group.

Examples of the alkoxy groups include those having 1 to 4 carbon atoms such as methoxy, ethoxy, hydroxyethoxy, propoxy, n-butoxy, isobutoxy, sec-butoxy, and t-butoxy group. Examples of the halogen atoms include atoms such as fluorine, chlorine, bromine, and iodine atom.

These substituent groups may have additionally a substituent such as an alkoxy group having 1 to 4 carbon atoms, a halogen atom (fluorine, chlorine, or iodine atom), an aryl group having 6 to 10 carbon atoms, an alkenyl group having 2 to 6 carbon atoms, a cyano group, a hydroxy group, a carboxy group, an alkoxycarbonyl group, or a nitro group.

In addition, $R^4$ represents a bivalent connecting group selected from the group consisting of alkylene, cycloalkylene, and arylene groups, and is preferably an arylene group. These alkylene, cycloalkylene, and arylene groups may also be substituted, and examples of the substituent group that may be introduced are the same as those described for $R^1$ to $R^3$. Other favorable examples of $R^1$ to $R^3$ in Formula (I) include the groups shown below. In the Formula, the definition of $R^S$ is the same as that described for $R^1$ to $R^3$.

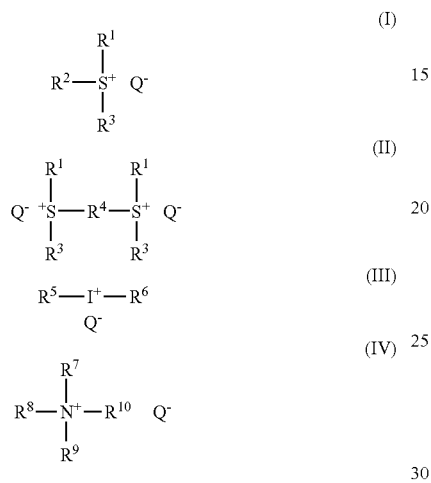

$Q^-$ represents $OH^-$, an aliphatic carboxylate anion, or an aromatic carboxylate anion. Examples of the carboxylate anions include the anions having —COO$^-$ which is derived from COOH of the carboxylic acid compounds having the structures shown below.

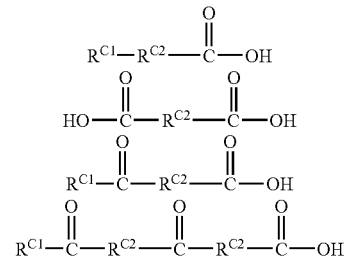

wherein, $R^{C1}$ represents a linear or branched alkyl group having 1 to 30 carbon atoms, a cycloalkyl group having 3 to 30 carbon atoms, a linear, branched or cyclic alkenyl group having 1 to 20 carbon atoms, a linear, branched or cyclic alkynyl group having 1 to 20 carbon atoms, a linear, branched or cyclic alkoxy group having 1 to 20 carbon atoms, a substituted or unsubstituted aryl group having 6 to 20 carbon atoms, a halogen atom, a nitro group, or a camphor residue. The alkyl or cycloalkyl group may contain a heteroatom such as oxygen or nitrogen, and part or all of the hydrogen atoms in the alkyl, cycloalkyl, or alkenyl group may be substituted with halogen atoms such as fluorine or hydroxyl groups.

The alkyl, cycloalkyl, or aryl group may be substituted additionally with an alkyl, nitro, hydroxyl, alkoxy, acyl or alkoxycarbonyl group, a halogen atom, or the like.

$R^{C2}$ represents a single bond, a linear, branched or cyclic alkylene group having 1 to 20 carbon atoms, a linear, branched or cyclic alkenylene group having 1 to 20 carbon atoms, or an alkoxyalkylene group having 2 to 20 carbon atoms. The alkylene group may contain a heteroatom such as oxygen or nitrogen in its chain. Part or all of the hydrogen atoms in the alkylene or alkenylene group may be substituted with halogen atoms such as fluorine or hydroxyl groups.

In Formula (III), $R^5$ and $R^6$ each independently represent an alkyl, cycloalkyl, aralkyl, or aryl group, and is preferably an aryl group. Examples of these groups include those for $R^1$ to $R^3$ in Formula (I) above. $R^5$ and $R^6$ may be substituted, and examples of the substituent groups include the substituent groups exemplified for $R^1$ to $R^3$ in Formula (I). The definition of $Q^-$ is the same as that in Formula (I) or (II).

In Formula (IV), $R^7$ to $R^{10}$ each independently represent an alkyl, cycloalkyl, aralkyl, or aryl group. Two groups of $R^7$ to $R^{10}$ may bind to each other to form a ring. $Q^-$ is the same definition as that in Formula (I).

In addition, any one of $R^7$ to $R^{10}$ and $Q^-$ may bind to each other to form an intramolecular salt. Favorable examples of $R^7$ to $R^{10}$ are the same as those for $R^1$ to $R^3$ in Formula (I) above. $R^7$ to $R^{10}$ may be substituted additionally, and examples of the substituent groups include the substituent groups exemplified for $R^1$ to $R^3$ in Formula (I).

Such specific base compounds (c) are described in detail, for example, as carboxylic onium salts in JP-A No. 2002-122994, and fluorine-substituted aliphatic, aromatic carboxylic acids in JP-A No. 2001-281849, and these compounds may also be applied to the invention.

Typical examples of the specific base compounds (c) in the invention include the compounds described in JP-A No. 2002-122994 above, paragraph [0205] to [0215], and the compounds described in JP-A No. 2001-281849, paragraph [0025] to [0040].

Hereinafter, as examples of the specific base compounds (c) favorably used in the invention, compounds (c-1) to (c-63) are listed, but the invention is not limited thereto.

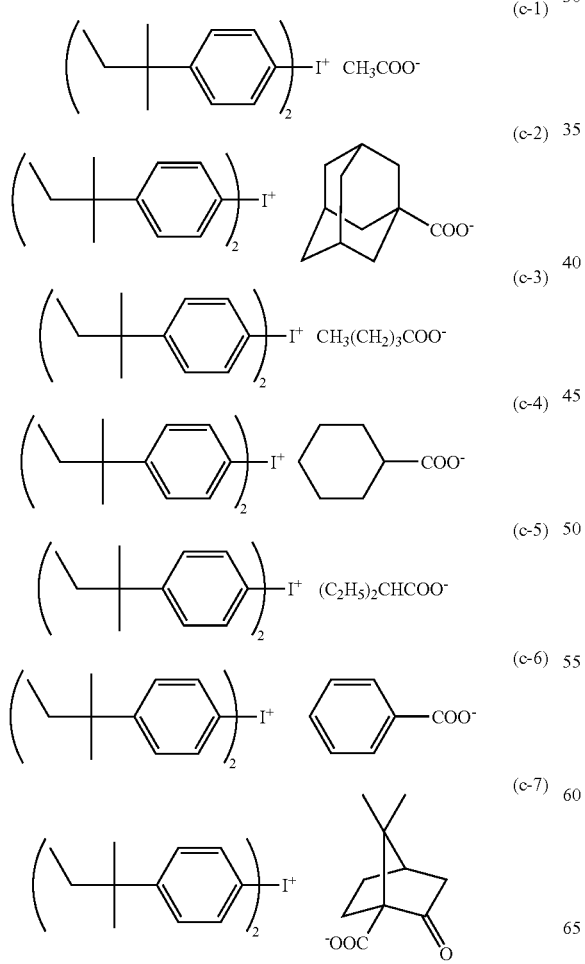

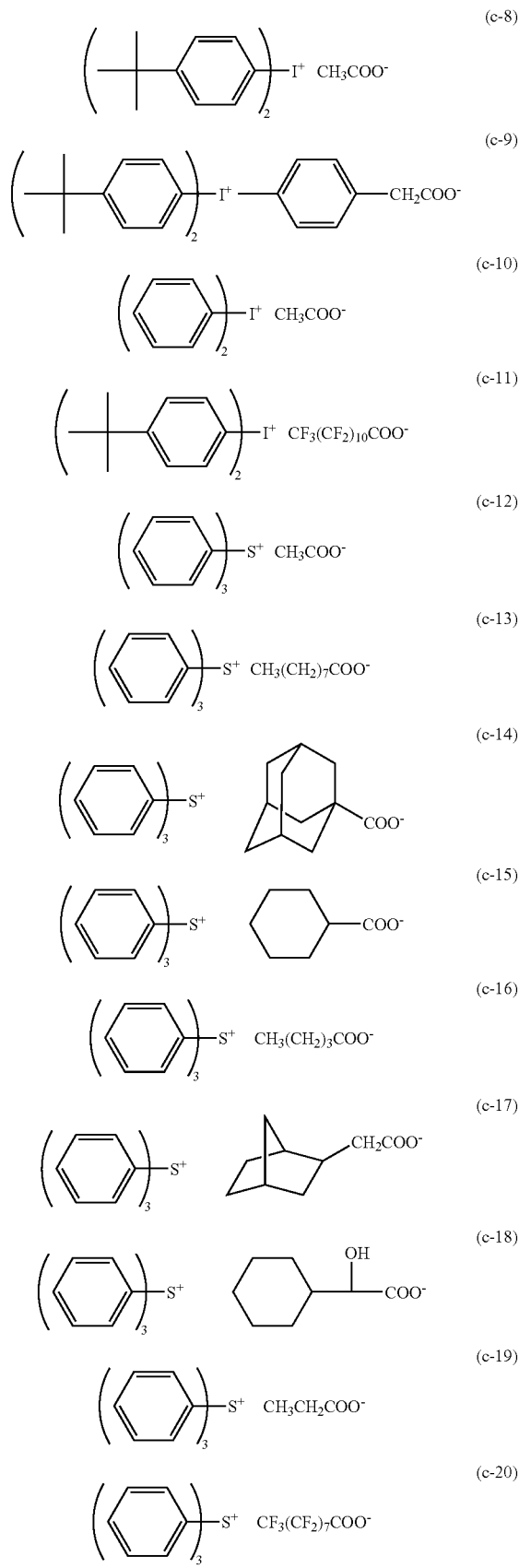

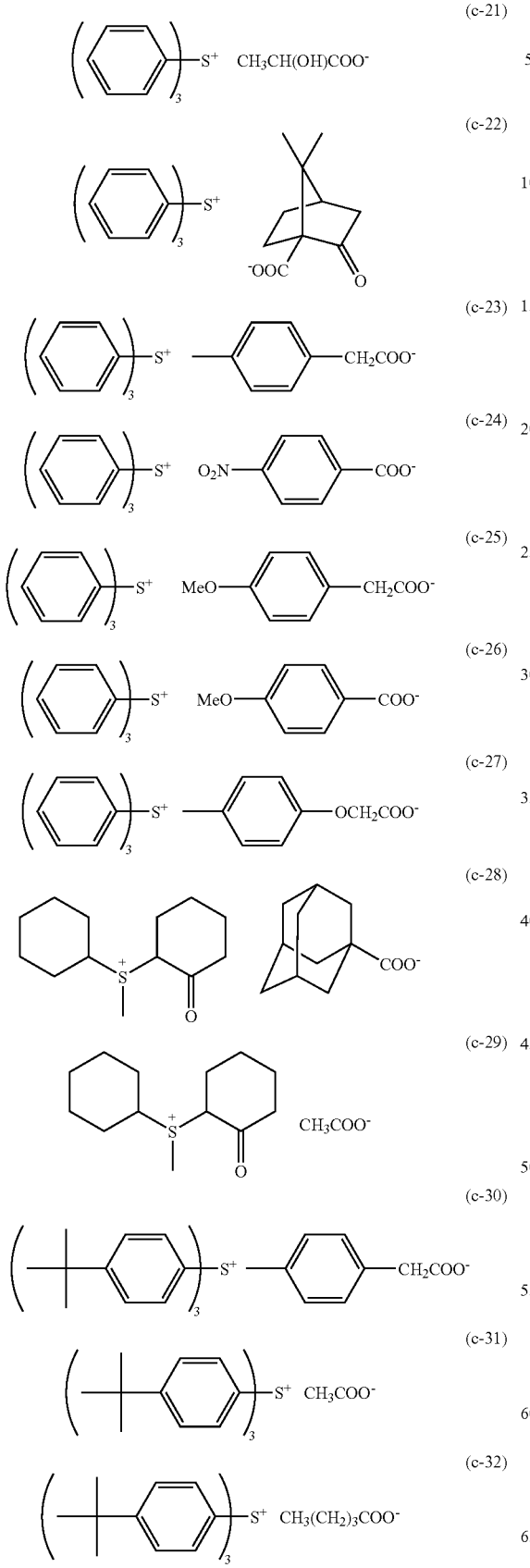
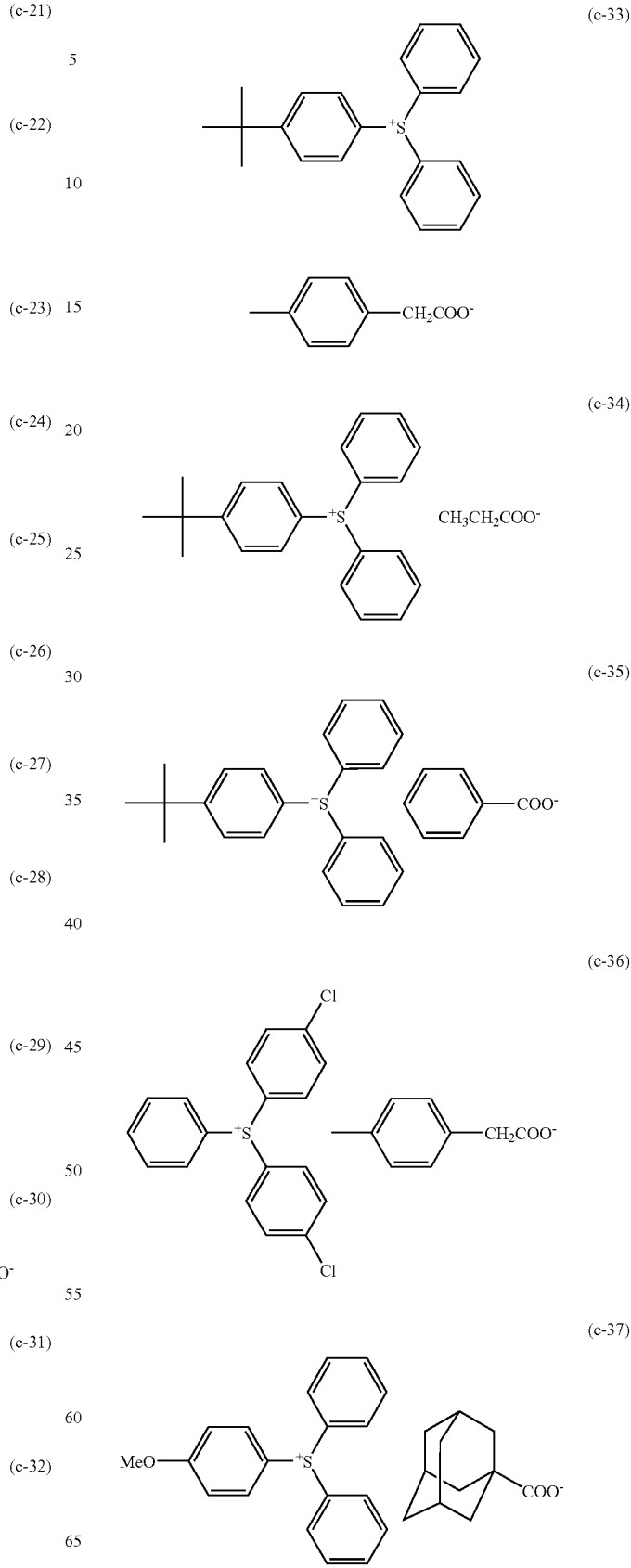

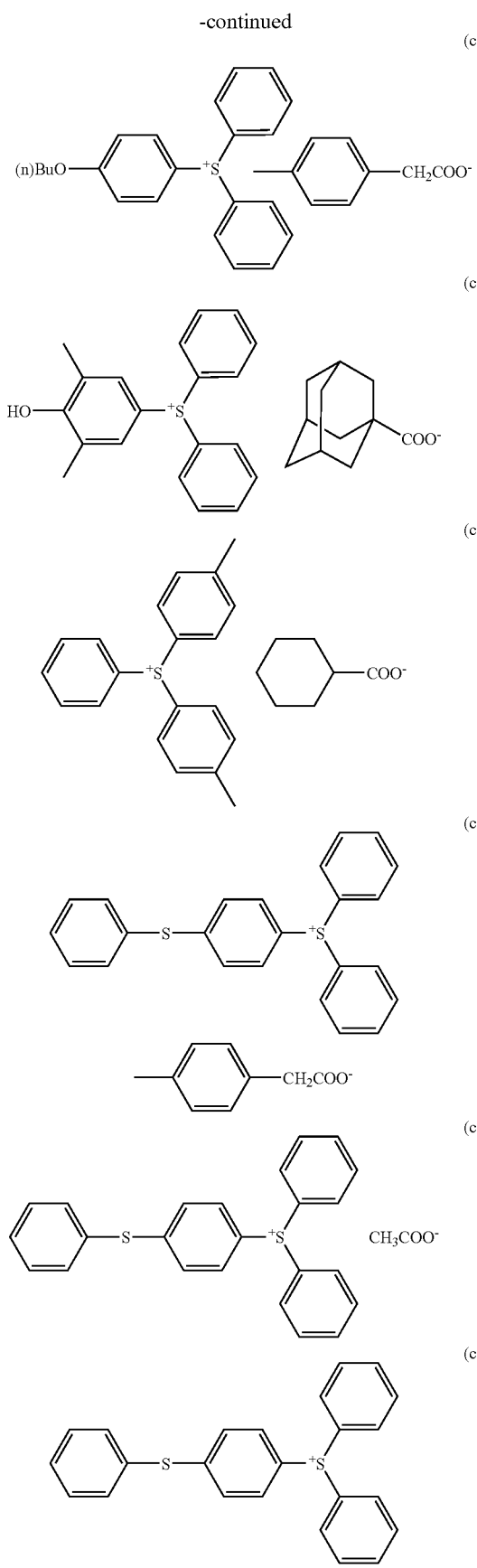
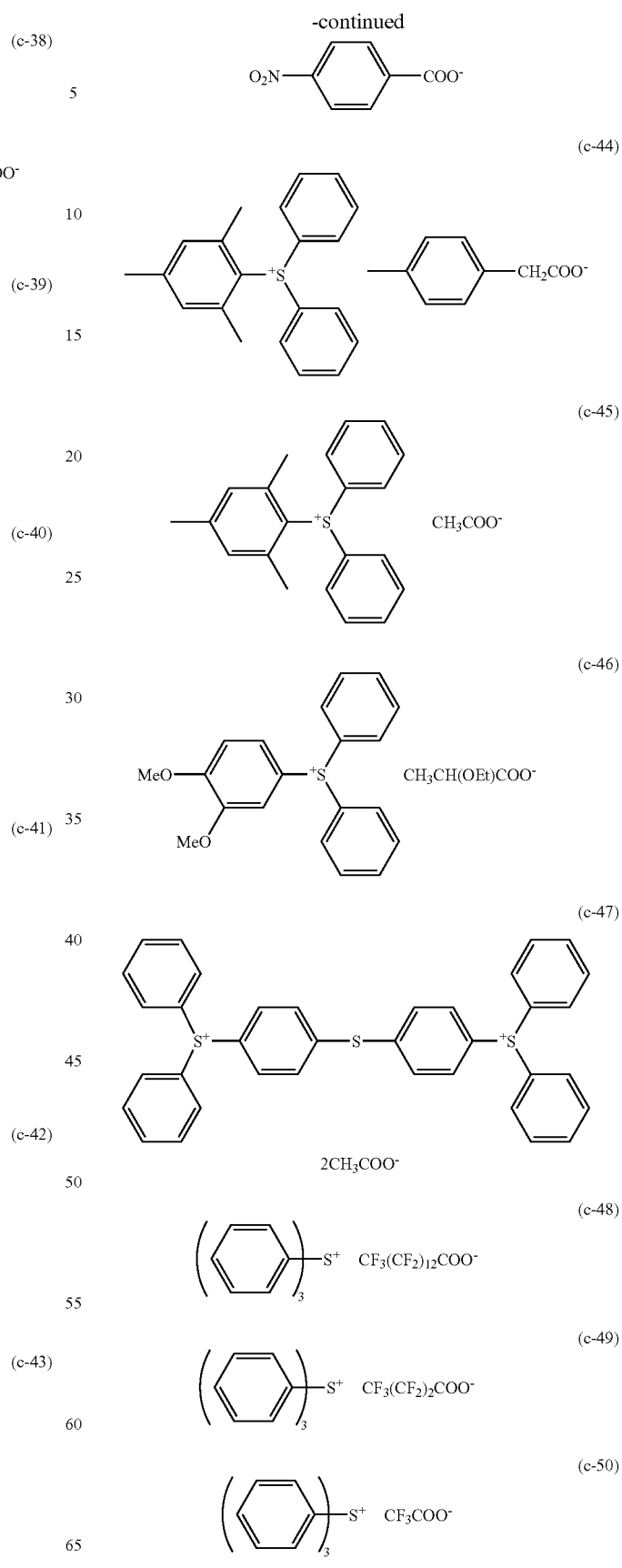

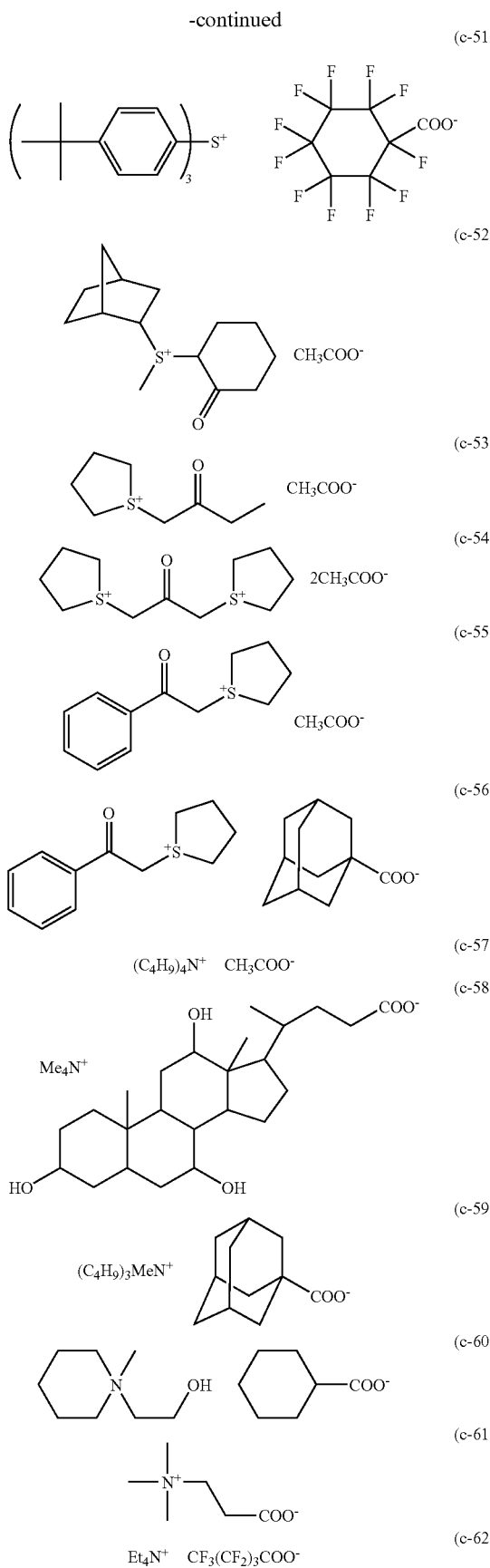

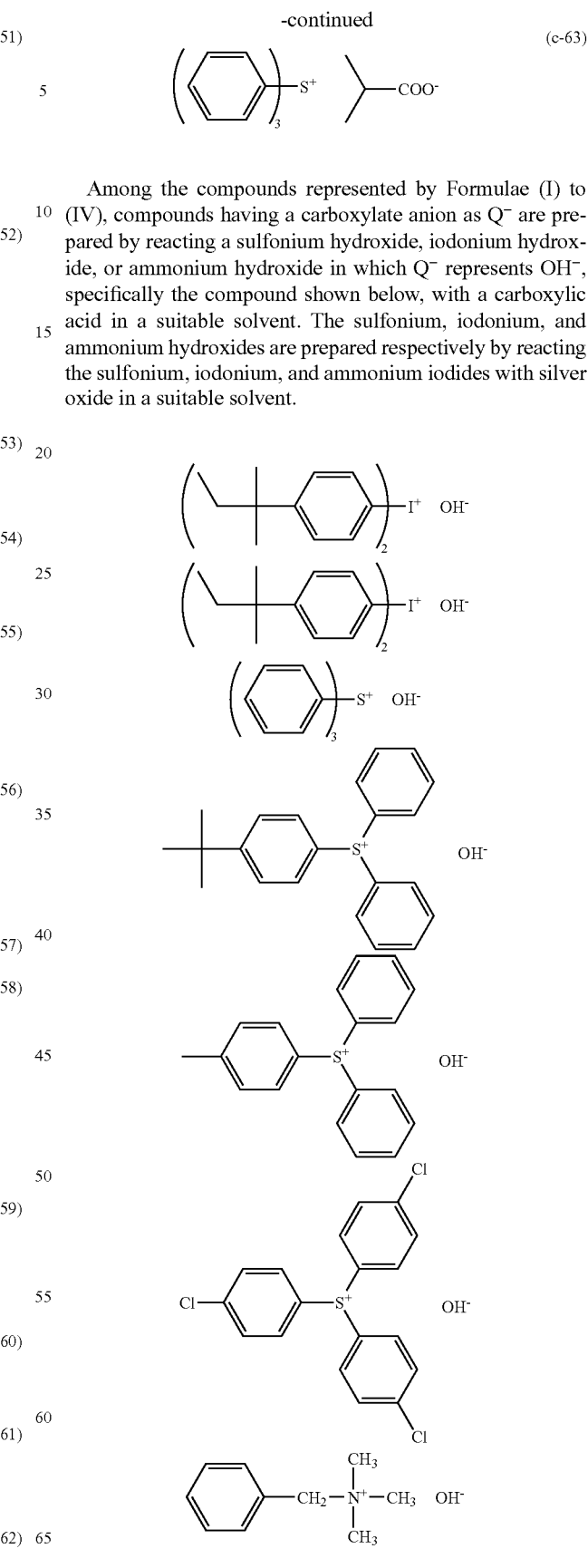

Among the compounds represented by Formulae (I) to (IV), compounds having a carboxylate anion as Q⁻ are prepared by reacting a sulfonium hydroxide, iodonium hydroxide, or ammonium hydroxide in which Q⁻ represents OH⁻, specifically the compound shown below, with a carboxylic acid in a suitable solvent. The sulfonium, iodonium, and ammonium hydroxides are prepared respectively by reacting the sulfonium, iodonium, and ammonium iodides with silver oxide in a suitable solvent.

The specific base compounds (c) may be used alone or in combination of two or more in the ink composition according to the invention. The content of the specific base compound (c) in the ink composition is normally 0.001 to 10 wt %, preferably 0.01 to 7 wt %, and still more preferably 0.03 to 5 wt % based on the total solid content of the ink composition.

[Cationically Polymerizable Compound (a)]

The cationically polymerizable compound (a) to be used in the invention is not particularly limited, if it is a compound which is curable in the polymerization reaction initiated by the acid generated from a photochemical acid generator (b) described hereinafter, and any one of various cationically polymerizable monomers known as photocationically polymerizable monomers may be used. Examples of the cationically polymerizable monomers include the epoxy, vinyl ether, and oxetane compounds described in JP-A Nos. 6-9714, 2001-31892, 2001-40068, 2001-55507, 2001-310938, 2001-310937, 2001-220526 and the like.

The epoxy compound is, for example, an aromatic epoxide, an alicyclic epoxide, an aliphatic epoxide, or the like. The aromatic epoxide is, for example, a di- or poly-glycidyl ether prepared by reacting a polyvalent phenol having at least one aromatic ring or the alkylene oxide adduct thereof with an epichlorohydrin. Examples thereof include di- or poly-glycidyl ethers of bisphenol A or the alkylene oxide adducts thereof, di- or poly-glycidyl ethers of hydrogenated bisphenol A or the alkylene oxide adducts thereof, novolak epoxy resins, and the like. The alkylene oxides are, for example, ethylene oxide, propylene oxide, and the like.

A favorable example of the alicyclic epoxide is a cylcohexene oxide- or cyclopentene oxide-containing compound, which is prepared by epoxidizing a compound having at least one cycloalkane ring such as cyclohexene or cyclopentene with a suitable oxidizing agent such as hydrogen peroxide or peracid.

The aliphatic epoxide is, for example, a di- or poly-glycidyl ether of an aliphatic polyvalent alcohol or the alkylene oxide adduct thereof; and typical examples thereof include alkylene glycol diglycidyl ethers such as ethylene glycol diglycidyl ether, propylene glycol diglycidyl ether, and 1,6-hexanediol diglycidyl ether; polyvalent alcohol polyglycidyl ethers such as di- or tri-glycidyl ether of glycerin or the alkylene oxide adducts thereof; polyalkylene glycol diglycidyl ethers such as diglycidyl ethers of polyethylene glycol or the alkylene oxide adducts thereof and diglycidyl ethers of polypropylene glycol or the alkylene oxide adducts thereof; and the like. The alkylene oxides are, for example, ethylene oxide, propylene oxide, and the like.

Examples of the monofunctional epoxy compounds to be used in the invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monooxide, 1,2-epoxide decane, epichlorohydrin, 1,2-epoxydecane, styrene oxide, cylcohexene oxide, 3-methacryloyloxymethylcylcohexene oxide, 3-acryloyloxymethylcylcohexene oxide, 3-vinylcyclohexene oxide and the like.

Examples of the multifunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, vinylcylcohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexanecarboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, 1,2,5,6-diepoxycyclooctane, and the like.

Among these epoxy compounds, aromatic and alicyclic epoxides are preferable and alicyclic epoxides are particularly preferable, from the viewpoint of curing speed.

Examples of the vinyl ether compounds include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; mono-vinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenylether-O-propylene carbonate, dodecyl vinyl ether, diethylene glycol monovinyl ether, and octadecyl vinyl ether; and the like.

Typical examples of the monofunctional vinyl ethers include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxy butyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, phenoxypolyethylene glycol vinyl ether and the like.

Examples of the multifunctional vinyl ethers include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ethers, and bisphenol F alkylene oxide divinyl ethers; multifunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, ethylene oxide adducts of trimethylolpropane trivinyl ether, propylene oxide adducts of trimethylolpropane trivinyl ether, ethylene oxide adducts of ditrimethylolpropane tetravinyl ether, propylene oxide adducts of ditrimethylolpropane tetravinyl ether, ethylene oxide adducts of pentaerythritol tetravinyl ether, propylene oxide adducts of pentaerythritol tetravinyl ether, ethylene oxide adducts of dipentaerythritol hexavinyl ether, and propylene oxide adducts of dipentaerythritol hexavinyl ether; and the like.

The vinyl ether compound is preferably a di- or tri-vinyl ether compound and particularly preferably a divinyl ether compound, from the viewpoints of curability, adhesiveness to the recording medium, and surface hardness of the formed image.

The oxetane compound according to the invention is a compound having an oxetane ring compound, and any one of known oxetane compounds, for example those described in JP-A Nos. 2001-220526, 2001-310937, and 2003-341217 may be used.

The compound having an oxetane ring to be used in the ink composition according to the invention is preferably a compound having one to four oxetane rings in its structure. Use of such a compound is effective in controlling the viscosity of the ink composition in the range favorable for handling and improving the adhesiveness between the ink after hardening and the recording medium.

Examples of the compounds having one or two oxetane rings in the molecule include the compounds represented by the following Formulae (1) to (3), and the like.

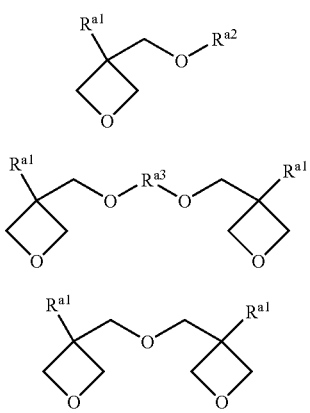

$R^{a1}$ represents a hydrogen atom, an alkyl group having 1 to 6 carbon atoms, a fluoroalkyl group having 1 to 6 carbon atoms, an allyl group, an aryl group, a furyl group or a thienyl group. When there are two $R^{a1}$ groups in the molecule, they may be the same as or different from each other.

The alkyl group is, for example, a methyl, ethyl, propyl, or butyl group, or the like; and the fluoroalkyl group is preferably, for example, one of the alkyl groups above of which one hydrogen is substituted with a fluorine atom.

$R^{a2}$ represents a hydrogen atom, an alkyl group having 1 to 6 carbon atoms, an alkenyl group having 2 to 6 carbon atoms, an aromatic ring-containing group, an alkylcarbonyl group having 2 to 6 carbon atoms, an alkoxycarbonyl group having 2 to 6 carbon atoms, or an N-alkylcarbamoyl group having 2 to 6 carbon atoms. Examples of the alkyl groups include methyl, ethyl, propyl, and butyl groups and the like; examples of the alkenyl groups include 1-propenyl, 2-propenyl, 2-methyl-1-propenyl, 2-methyl-2-propenyl, 1-butenyl, 2-butenyl, and 3-butenyl groups and the like; and examples of the aromatic ring-containing groups include phenyl, benzyl, fluorobenzyl, methoxybenzyl, and phenoxyethyl groups and the like. Examples of the alkylcarbonyl groups include ethylcarbonyl, propylcarbonyl, and butylcarbonyl groups and the like; examples of the alkoxycarbonyl groups include ethoxycarbonyl, propoxycarbonyl, and butoxycarbonyl groups and the like; and examples of the N-alkylcarbamoyl groups include ethylcarbamoyl, propylcarbamoyl, butylcarbamoyl, and pentylcarbamoyl groups and the like.

$R^{a3}$ represents a linear or branched alkylene group, a linear or branched poly(alkyleneoxy) group, a linear or branched unsaturated hydrocarbon group, a carbonyl group or a carbonyl group-containing alkylene group, a carboxyl group-containing alkylene group, a carbamoyl group-containing alkylene group, or a group shown below. The alkylene groups are, for example, ethylene, propylene, and butylene groups; the poly(alkyleneoxy) groups are, for example, poly(ethyleneoxy) and poly(propyleneoxy) groups and the like. The unsaturated hydrocarbon groups are, for example, propenylene, methylpropenylene, and butenylene groups and the like.

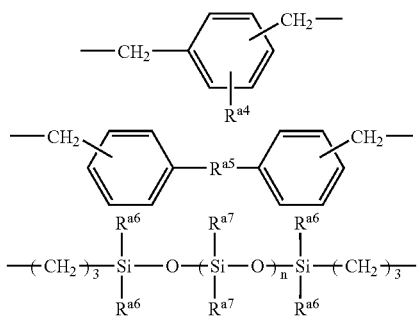

When $R^{a3}$ is one of the polyvalent groups above, $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkylcarboxyl group, a carboxyl group, or a carbamoyl group.

$R^{a5}$ represents an oxygen or sulfur atom, a methylene group, NH, SO, $SO_2$, $C(CF_3)_2$, or $C(CH_3)_2$.

$R^{a6}$ represents an alkyl group having 1 to 4 carbon atoms or an aryl group; and n is an integer of 0 to 2,000. $R^{a7}$ represents an alkyl group having 1 to 4 carbon atoms, an aryl group, or a monovalent group having the structure shown below. In the following Formula, $R^{a8}$ is an alkyl group having 1 to 4 carbon atoms or an aryl group; and m is an integer of 0 to 100.

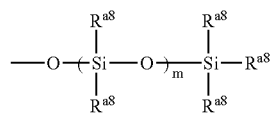

Examples of the compounds having three or four oxetane rings include the compounds represented by the following Formula (4).

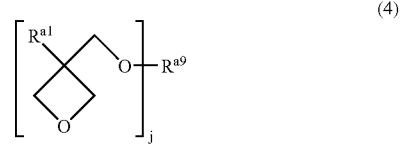

In Formula (4), $R^{a1}$ is the same definition as that in Formula (1) above. $R^{a9}$, which is another connecting group, is, for example, a branched alkylene group having 1 to 12 carbon atoms such as the group represented by the following Formula A, B, or C, a branched poly(alkyleneoxy) group such as the group represented by the following Formula D, a branched polysiloxy group represented by the following Formula E, or the like. j is 3 or 4.

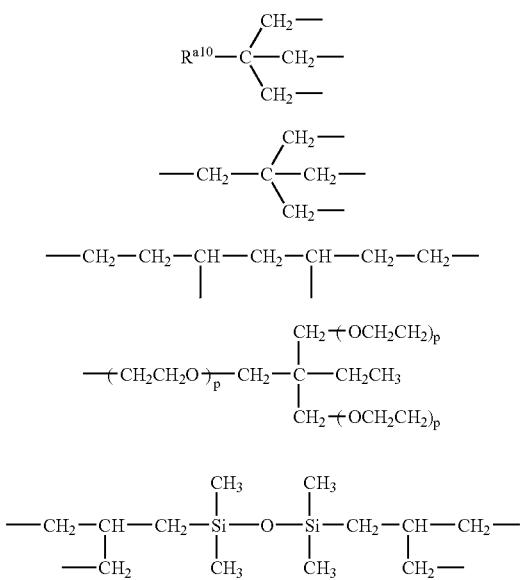

In Formula A, $R^{a10}$ represents a methyl, ethyl or propyl group, and in Formula D, p is an integer of 1 to 10.

Other examples of the oxetane compounds favorably used in the invention include the compounds having oxetane rings on the side chains represented by the following Formula (5).

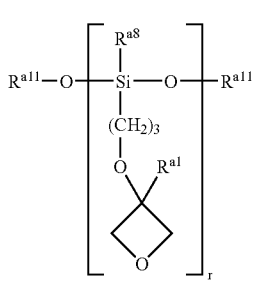

(5)

In Formula (5), $R^{a8}$ is the same definition as that in the Formula above. $R^{a11}$ represents an alkyl group having 1 to 4 carbon atoms, such as methyl, ethyl, propyl or butyl, or a trialkylsilyl group; and r is 1 to 4.

Such compounds having oxetane rings are described specifically in JP-A No. 2003-341217, paragraph [0021] to [0084], and the compounds described therein can be used favorably in the invention.

Among the oxetane compounds to be used in the invention, a compound having one oxetane ring is preferable, from the viewpoints of ink-composition viscosity and tackiness.

The ink composition according to the invention may contain only one, or two or more of these cationically polymerizable compounds, but it is preferable to use at least one compound selected from the oxetane and epoxy compounds and a vinyl ether compound in combination, for preventing effectively shrinkage during curing of ink.

The content of the cationically polymerizable compound (a) in the ink composition is suitably in the range of 10 to 95 wt %, preferably 30 to 90 wt %, and still more preferably 50 to 85 wt % based on the total solid content of the composition.

[Compound (b) that Generates an Acid by Irradiation with a Radiation Ray]

The ink composition according to the invention contains a compound that generates acid by irradiation with a radiation ray (hereinafter, referred to as photochemical acid generator). A photocationically polymerizable photoinitiator, a photoradically polymerizable photoinitiator, a photodecolorant to colorants, a photoalterant, or a compound that generates acid by irradiation of light such as the light used for microresist (ultraviolet light at a wavelength of 400 to 200 nm, far ultraviolet ray, particularly preferably, g-ray, h-ray, i-ray, or KrF excimer laser beam), ArF excimer laser beam, electron beam, X-ray, molecular or ion beam, or the like, may be used, as the photochemical acid generator for use in the invention.

Examples of the photochemical acid generators include onium salt compounds such as diazonium salts, phosphonium salts, sulfonium salts, and iodonium salts, sulfonate compounds such as imidosulfonates, oximesulfonates, diazodisulfones, disulfones, and o-nitrobenzylsulfonates, and the like, which decompose and generate acid by irradiation with a radiation ray.

Other examples of the compounds that generate acid by irradiation with a radiation ray or other activated light used in the invention include the diazonium salts described in S. I. Schlesinger, Photogr. Sci. Eng., 18, 387 (1974), T. S. Bal et al., Polymer, 21, 423 (1980), and others; the ammonium salts described in U.S. Pat. Nos. 4,069,055, 4,069,056, and U.S. Reissue No. 27,992, JP-A No. 3-140,140, and others; the phosphonium salts described in D. C. Necker et al., Macromolecules, 17, 2468 (1984), C. S. Wen et al., Teh, Proc. Conf. Rad. Curing ASIA, p. 478 Tokyo, October (1988), U.S. Pat. Nos. 4,069,055 and 4,069,056, and others; the iodonium salts described in J. V. Crivello et al., Macromolecules, 10(6), 1307 (1977), Chem. & Eng. News, November 28, p. 31 (1988), EP Nos. 104,143, 339,049, and 410,201, JP-A Nos. 2-150848 and 2-296514, and others;

the sulfonium salts described in J. V. Crivello et al., Polymer J. 17, 73 (1985), J. V. Crivello et al., J. Org. Chem., 43, 3055 (1978), W. R. Watt et al., J. Polymer Sci., Polymer Chem. Ed., 22, 1789 (1984), J. V. Crivello et al., Polymer Bull., 14, 279 (1985), J. V. Crivello et al, Macromolecules, 14(5), 1141 (1981), J. V. Crivello et al., J. Polymer Sci., Polymer Chem. Ed., 17, 2877 (1979), EP Nos. 370,693, 161, 811, 410,201, 339,049, 233,567, 297,443, and 297,442, U.S. Pat. Nos. 3,902,114, 4,933,377, 4,760,013, 4,734,444, and 2,833,827, German Patent Nos. 2,904,626, 3,604,580, and 3,604,581, JP-A Nos. 7-28237 and 8-27102, and others;

the selenonium salts described in J. V. Crivello et al., Macromolecules, 10(6), 1307 (1977), J. V. Crivello et al., J. Polymer Sci., Polymer Chem. Ed., 17, 1047 (1979), and others;

the onium salts such as arsonium salts described in C. S. Wen et al., Teh, Proc. Conf. Rad. Curing ASIA, p. 478 Tokyo, October (1988), and others; the organic halogen compounds described in U.S. Pat. No. 3,905,815, JP-B No. 46-4605, JP-A Nos. 48-36281, 55-32070, 60-239736, 61-169835, 61-169837, 62-58241, 62-212401, 63-70243, and 63-298339, and others; the organic metals/organic halides described in K. Meier et al., J. Rad. Curing, 13(4), 26 (1986), T. P. Gill et al., Inorg. Chem., 19, 3007 (1980), D. Astruc, Acc. Chem. Res., 19 (12), 377 (1896), JP-A No. 2-161445, and others;

the photochemical acid generators containing an O-nitrobenzyl protecting group described in S. Hayase et al., J. Polymer Sci., 25, 753 (1987), E. Reichmanis et al., J. Polymer Sci., Polymer Chem. Ed., 23, 1 (1985), Q. Q. Zhu et al., J. Photochem., 36, 85, 39, 317 (1987), B. Amit et al., Tetrahedron Lett., (24) 2205 (1973), D. H. R. Barton et al., J. Chem. Soc., 3571 (1965), P. M. Collins et al., J. Chem. Soc., Perkin I, 1695 (1975), M. Rudinstein et al., Tetrahedron Lett., (17), 1445 (1975), J. W. Walker et al., J. Am. Chem. Soc., 110, 7170 (1988), S. C. Busman et al., J. Imaging Technol., 11 (4), 191 (1985), H. M. Houlihan et al., Macromolecules, 21, 2001 (1988), P. M. Collins et al., J. Chem. Soc., Chem. Commun., 532 (1972), S. Hayase et al., Macromolecules, 18, 1799 (1985), E. Reichmanis et al., J. Electrochem. Soc., Solid State Sci. Technol., 130 (6), F. M. Houlihan et al., Macromolecules, 21, 2001 (1988), EP Nos. 0290,750, 046,083, 156,535, 271, 851, and 0,388,343, U.S. Pat. Nos. 3,901,710 and 4,181,531, JP-A Nos. 60-198538 and 53-133022, and others; and the sulfonic compounds that photodecompose to generate an acid such as iminosulfonates described in M. Tunooka et al., Polymer Preprints Japan, 35 (8), G. Berner et al., J. Rad. Curing, 13 (4), W. J. Mijs et al., Coating Technol., 55 (697), 45 (1983), Akzo, H. Adachi et al., Polymer Preprints Japan, 37(3), EP Nos. 0199,672, 84515, 044,115, 618,564, and 0101,122, U.S. Pat. Nos. 4,371,605 and 4,431,774, JP-A Nos. 64-18143, 2-245756, and 3-140109, and others; the disulfonated compounds described in JP-A Nos. 61-166544 and 2-71270, and others; and the diazoketosulfone and diazodisulfonated compounds described in JP-A Nos. 3-103854, 3-103856, and 4-210960 and others.

In addition, compounds having a group generating acid by the light described above or polymers having such a compound in the main chain or on the side chain including those described in M. E. Woodhouse et al., J. Am. Chem. Soc., 104, 5586 (1982), S. P. Pappas et al., J. Imaging Sci., 30 (5), 218 (1986), S. Kondo et al., Macromol. Chem., Rapid Commun., 9, 625 (1988), Y. Yamada et al., Macromol. Chem., 152, 153, 163 (1972), J. V. Crivello et al., J. Polymer Sci., Polymer Chem. Ed., 17, 3845 (1979), U.S. Pat. No. 3,849,137, German Patent No. 3914407, JP-A Nos. 63-26653, 55-164824, 62-69263, 63-146038, 63-163452, 62-153853, and 63-146029, and others, may also be used. Examples thereof include onium salts such as diazonium salts, ammonium salts, phosphonium salts, iodonium salts, sulfonium salts, selenonium salts, and arsonium salts; organic halogen compounds, organic metals/organic halides, o-nitrobenzyl protecting group-containing photochemical acid generators, sulfonic compounds that generates acid by photochemical decomposition such as iminosulfonates, disulfonated compounds, diazoketosulfones, and diazodisulfonated compounds.

The compounds that generate acid by light described in V. N. R. Pillai, Synthesis, (1), 1 (1980), A. Abad et al., Tetrahedron Lett., (47) 4555 (1971), D. H. R. Barton et al., J. Chem. Soc., (C), 329 (1970), U.S. Pat. No. 3,779,778, EP No. 126, 712, and others may also be used.

Favorable examples of the photochemical acid generators to be used in the invention include the compounds represented by the following Formulae (b1), (b2), and (b3).

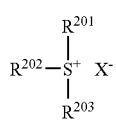

(b1)

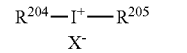

(b2)

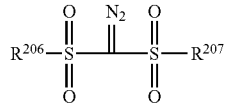

(b3)

In Formula (b1), $R^{201}$, $R^{202}$ and $R^{203}$ each independently represents an organic group. $X^-$ represents a non-nucleophilic anion, and is preferably a sulfonate anion, carboxylate anion, bis(alkylsulfonyl)amide anion, tris(alkylsulfonyl)methide anion, $BF_4^-$, $PF_6^-$, $SbF_6^-$ or a group shown below, preferably an organic anion having one or more carbon atoms.

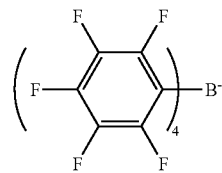

Favorable organic anions include the organic anions shown in the following Formulae.

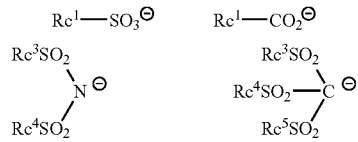

$Rc^1$ represents an organic group.

The organic group of $Rc^1$ is, for example, a group having 1 to 30 carbon atoms, and preferably an alkyl group, a cycloalkyl group, an aryl group, or a group wherein two or more of these groups are bound to each other via a connecting group such as single bond, —O—, —$CO_2$—, —S—, —$SO_3$—, or —$SO_2N(Rd^1)$—.

$Rd^1$ represents a hydrogen atom or an alkyl group.

$Rc^3$, $Rc^4$, and $Rc^5$ each independently represent an organic group.

The organic group of $Rc^3$, $Rc^4$, or $Rc^5$ is preferably the same as the organic group favorable as $Rc^1$ and particularly preferably a perfluoroalkyl group having 1 to 4 carbon atoms.

$Rc^3$ and $Rc^4$ may bind to each other to form a ring.

The group formed by binding between $Rc^3$ and $Rc^4$ is, for example, an alkylene group or an arylene group, preferably a perfluoroalkylene group having 2 to 4 carbon atoms.

The organic group of $Rc^1$ or $Rc^3$ to $Rc^5$ is most preferably an alkyl group of which the hydrogen at 1 position is replaced with a fluorine atom or a fluoroalkyl group or a phenyl group substituted with a fluorine atom or a fluoroalkyl group. Presence of a fluorine atom or a fluoroalkyl group results in increasing the acidity of the acid generated by photoirradiation, whereby sensitivity increases.

The organic group of $R^{201}$, $R^{202}$ or $R^{203}$ is generally a group having 1 to 30 carbon atoms, preferably 1 to 20 carbon atoms, and two groups of $R^{201}$ to $R^{203}$ may bind to each other to form a ring structure, which may contain an oxygen or sulfur atom or an ester, amide or carbonyl group.

The group formed by binding between two groups of $R^{201}$ to $R^{203}$ is, for example, an alkylene group (e.g., butylene or pentylene).

Typical example of the organic groups of $R^{201}$, $R^{202}$ and $R^{203}$ include the groups corresponding to the compounds (b1-1), (b1-2), and (b1-3) described below.

The photochemical acid generator may be a compound having multiple groups in the structure represented by Formula (b1). For example, it may be a compound having a structure wherein at least one of $R^{201}$ to $R^{203}$ in the compound represented by Formula (b1) is bound, directly or via a connecting group, to at least one of $R^{201}$ to $R^{203}$ in the other compound represented by Formula (b1).

Still more preferable components (b1) include the compounds (b1-1), (b1-2), and (b1-3) described below.

The compound (b1-1) is an arylsulfonium compound wherein at least one of $R^{201}$ to $R^{203}$ in Formula (b1) above is an aryl group, i.e., a compound having an arylsulfonium ion as its cation.

All of $R^{201}$ to $R^{203}$ in the arylsulfonium compound may be aryl groups; or alternatively, a part of $R^{201}$ to $R^{203}$ may be aryl groups and the other is an alkyl or cycloalkyl group.

Examples of the arylsulfonium compounds include triarylsulfonium compounds, diarylalkylsulfonium compounds, aryldialkylsulfonium compounds, diarylcycloalkylsulfonium compounds, aryldicycloalkylsulfonium compounds, and the like.

The aryl group in the arylsulfonium compounds is preferably an aryl group such as phenyl or naphthyl, or a heteroaryl group such as indole or pyrrole residues, and more preferably a phenyl or indole residue. When the arylsulfonium compound has two or more aryl groups, the two or more aryl groups may be the same as or different from each other.

The alkyl group that the arylsulfonium compound may have as needed is preferably a linear or branched alkyl group having 1 to 15 carbon atoms, and examples thereof include methyl, ethyl, propyl, n-butyl, sec-butyl, and t-butyl groups and the like.

The cycloalkyl group that the arylsulfonium compound may have as needed is preferably a cycloalkyl group having 3 to 15 carbon atoms, and examples thereof include cyclopropyl, cyclobutyl, and cyclohexyl groups, and the like.

The aryl, alkyl, or cycloalkyl group of $R^{201}$ to $R^{203}$ may have an alkyl group (e.g., that having 1 to 15 carbon atoms), a cycloalkyl group (e.g., that having 3 to 15 carbon atoms), an aryl group (e.g., that having 6 to 14 carbon atoms), an alkoxy group (e.g., that having 1 to 15 carbon atoms), a halogen atom, a hydroxyl group, or a phenylthio group as the substituent group. Preferable examples of the substituent groups include linear or branched alkyl groups having 1 to 12 carbon atoms, cycloalkyl groups having 3 to 12 carbon atoms, and linear, branched or cyclic alkoxy groups having 1 to 12 carbon atoms; and most preferable are alkyl groups having 1 to 4 carbon atoms and alkoxy groups having 1 to 4 carbon atoms. All or any one of the three $R^{201}$ to $R^{203}$ may have a substituent group. In addition, when any one of $R^{201}$ to $R^{203}$ is an aryl group, the substituent group is preferably substituted at the p-position in the aryl group.

Hereinafter, the compound (b1-2) will be described.

The compound (b1-2) is a compound represented by Formula (b1), wherein $R^{201}$ to $R^{203}$ each independently represent a non-aromatic ring-containing organic group. The aromatic rings include aromatic rings containing a heteroatom.

The non-aromatic ring-containing organic group of $R^{201}$ to $R^{203}$ generally has 1 to 30 carbon atoms and preferably 1 to 20 carbon atoms.

$R^{201}$ to $R^{203}$ each independently, preferably represent an alkyl, cycloalkyl, allyl, or vinyl group, more preferably a linear, branched, or cyclic 2-oxoalkyl group or an alkoxycarbonylmethyl group, and particularly preferably a linear or branched 2-oxoalkyl group.

The alkyl group of $R^{201}$ to $R^{203}$ may be a straight-chain or branched group, and is preferably, a linear or branched alkyl group having 1 to 10 carbon atoms (e.g., methyl, ethyl, propyl, butyl, or pentyl), and more preferably a linear or branched 2-oxoalkyl group or an alkoxycarbonylmethyl group.

The cycloalkyl group of $R^{201}$ to $R^{203}$ is preferably, for example, a cycloalkyl group having 3 to 10 carbon atoms (e.g., cyclopentyl, cyclohexyl, or norbornyl); and a cyclic 2-oxoalkyl group is more preferable.

Favorable examples of the linear, branched, and cyclic 2-oxoalkyl groups of $R^{201}$ to $R^{203}$ include the alkyl and cycloalkyl groups described above having >C—O at the 2 position.

The alkoxy group in the alkoxycarbonylmethyl group of $R^{201}$ to $R^{203}$ is preferably, for example, an alkoxy group having 1 to 5 carbon atoms (e.g., methoxy, ethoxy, propoxy, butoxy, or pentoxy).

$R^{201}$ to $R^{203}$ may be substituted with a halogen atom, an alkoxy group (e.g., that having 1 to 5 carbon atoms), a hydroxyl group, a cyano group, or a nitro group additionally.

The compound (b1-3) is a compound represented by the following Formula (b1-3), i.e., a compound having a phenacyl sulfonium salt structure.

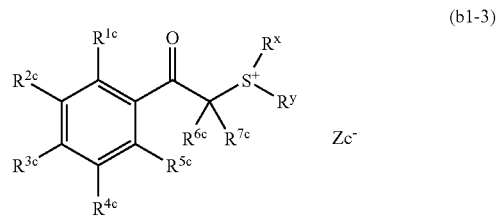

(b1-3)

In Formula (b1-3), $R^{1c}$ to $R^{5c}$ each independently represent a hydrogen or halogen atom, or an alkyl, cycloalkyl, or alkoxy group.

$R^{6c}$ and $R^{7c}$ each independently represent a hydrogen atom or an alkyl or cycloalkyl group.

$R^x$ and $R^y$ each independently represent an alkyl, cycloalkyl, allyl, or vinyl group.

Any two or more of $R^{1c}$ to $R^{5c}$, $R^{6c}$ and $R^{7c}$, or $R^x$ and $R^y$ may bind to each other to form a ring structure.

$Zc^-$ represents a non-nucleophilic anion, and is the same as the non-nucleophilic anion $X^-$ in Formula (b1).

The alkyl group of $R^{1c}$ to $R^{7c}$ may be a straight-chain or branching group, and examples thereof include linear or branched alkyl groups having 1 to 20 carbon atoms, preferably having 1 to 12 carbon atoms, (e.g., methyl, ethyl, linear or branched propyl, linear or branched butyl, and linear or branched pentyl).

The cycloalkyl group of $R^{1c}$ to $R^{7c}$ is preferably, for example, a cycloalkyl group having 3 to 8 carbon atoms (e.g., cyclopentyl or cyclohexyl).

The alkoxy group of $R^{1c}$ to $R^{5c}$ may be a linear, branched or cyclic group, and examples thereof include alkoxy groups having 1 to 10 carbon atoms, preferably linear and branching alkoxy groups having 1 to 5 carbon atoms (e.g., methoxy, ethoxy, linear or branched propoxy, linear or branched butoxy, and linear or branched pentoxy), and cyclic alkoxy groups having 3 to 8 carbon atoms (e.g., cyclopentyloxy and cyclohexyloxy).

Examples of the groups formed by binding of any two or more of $R^{1c}$ to $R^{5c}$, $R^{6c}$ and $^{7c}$, or $R^x$ and $R^y$ include butylene and pentylene groups and the like. The ring structure may contain an oxygen or sulfur atom or an ester or amide bond.

Preferably, part of the $R^{1c}$ to $R^{5c}$ are linear or branched alkyl groups, cycloalkyl groups, or linear, branched, or cyclic alkoxy groups; and more preferably, the total number of carbon atoms in groups $R^{1c}$ to $R^{5c}$ is 2 to 15. As a result, the acid generator is more soluble in solvent, and therefore, it is possible to suppress generation of particles during storage.

The alkyl and cycloalkyl groups of $R^x$ and $R^y$ include the same as those for the alkyl and cycloalkyl groups of $R^{1c}$ to $R^{7c}$.

Each of $R^x$ and $R^y$ is preferably a 2-oxoalkyl or alkoxycarbonylmethyl group.

The 2-oxoalkyl group is, for example, the same as those for the alkyl or cycloalkyl group having a >C=O group at the 2 position of $R^{1c}$ to $R^{5c}$.

Examples of the alkoxy group in the alkoxycarbonylmethyl group are the same as those for the alkoxy group of $R^{1c}$ to $R^{5c}$.

Each of $R^x$ and $R^y$ is preferably an alkyl or cycloalkyl group having 4 or more carbon atoms, more preferably the alkyl or cycloalkyl group having 6 or more carbon atoms and still more preferably 8 or more carbon atoms.

In Formula (b2) and (b3), $R^{204}$ to $R^{207}$ each independently represent an aryl, alkyl or cycloalkyl group. $X^-$ represents a non-nucleophilic anion, and is the same as the non-nucleophilic anion $X^-$ in Formula (b1).

The aryl group in $R^{204}$ to $R^{207}$ is preferably a phenyl or naphthyl group and more preferably a phenyl group.

The alkyl group in $R^{204}$ to $R^{207}$ may be a linear or branched group, and is preferably, for example, a linear or branched alkyl group having 1 to 10 carbon atoms (e.g., methyl, ethyl, propyl, butyl, or pentyl). The cycloalkyl group in $R^{204}$ to $R^{207}$ is preferably, for example, a cycloalkyl group having 3 to 10 carbon atoms (e.g., cyclopentyl, cyclohexyl, or norbornyl).

Examples of the substituent groups that $R^{204}$ to $R^{207}$ may have include alkyl groups (e.g., those having 1 to 15 carbon atoms), cycloalkyl groups (e.g., those having 3 to 15 carbon atoms), aryl groups (e.g., those having 6 to 15 carbon atoms), alkoxy groups (e.g., those having 1 to 15 carbon atoms), halogen atoms, a hydroxyl group, a phenylthio group, and the like.

Other usable examples of the compounds that generate an acid by irradiation of activated light or a radiation ray include the compounds represented by the following Formulae (b4), (b5), and (b6).

(b4)

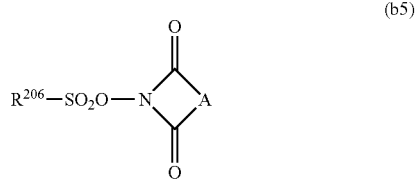
(b5)

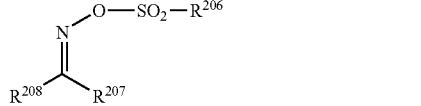
(b6)

In Formulae (b4) to (b6), $Ar^3$ and $Ar^4$ each independently represent an aryl group.

$R^{206}$, $R^{207}$ and $R^{208}$ each independently represent an alkyl, cycloalkyl or aryl group. A represents an alkylene, alkenylene or arylene group.

Among the photochemical acid generators above, preferable are the compounds represented by Formulae (b1) to (b3) and the like.

Favorable examples of the photochemical acid generators (b) to be used in the invention include compounds (b-1) to (b-96), which will be listed below, but the invention is not limited thereto.

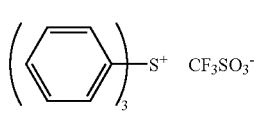
(b-1)

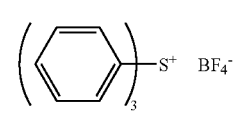
(b-2)

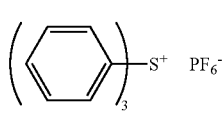
(b-3)

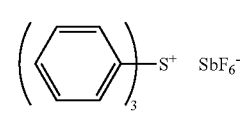
(b-4)

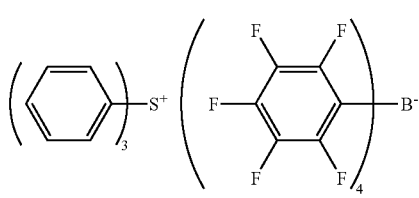
(b-5)

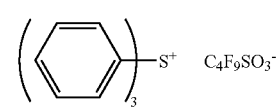
(b-6)

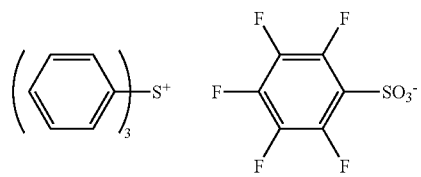 (b-7)
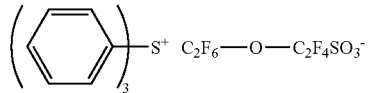 (b-8)
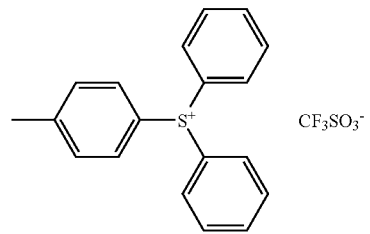 (b-9)
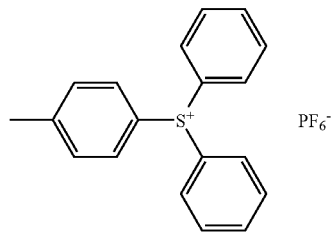 (b-10)
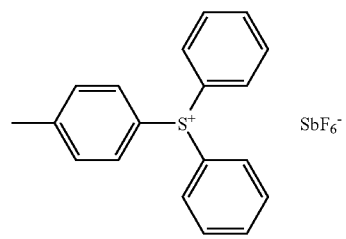 (b-11)
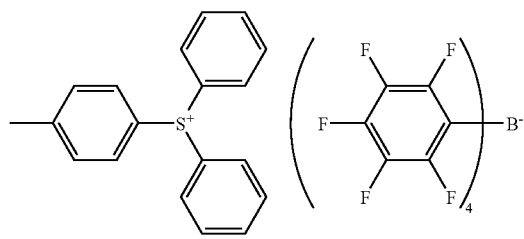 (b-12)
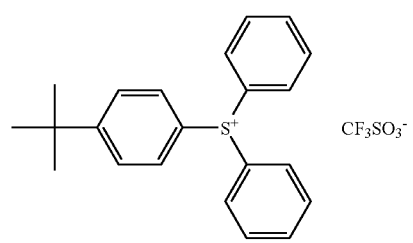 (b-13)
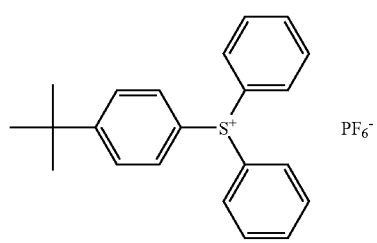 (b-14)
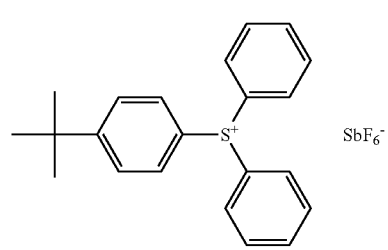 (b-15)
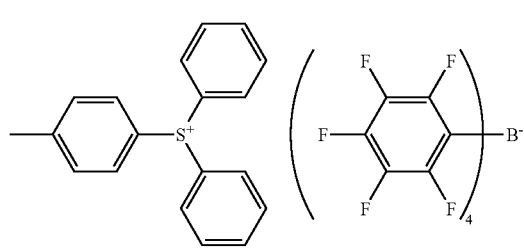 (b-16)
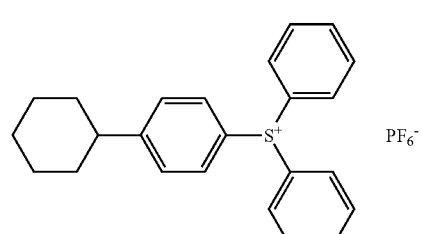 (b-17)
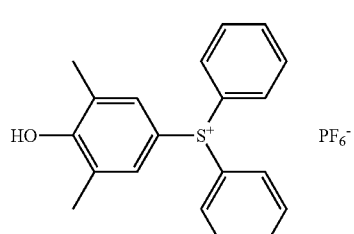 (b-18)
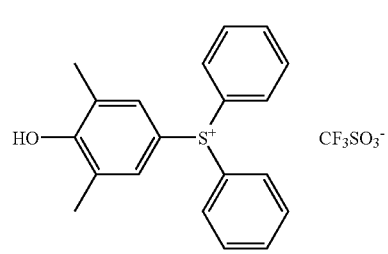 (b-19)
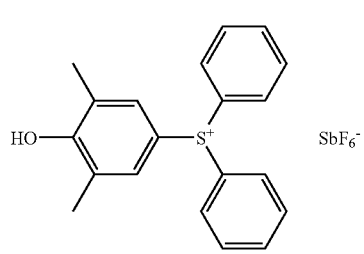 (b-20)

-continued
(b-21)
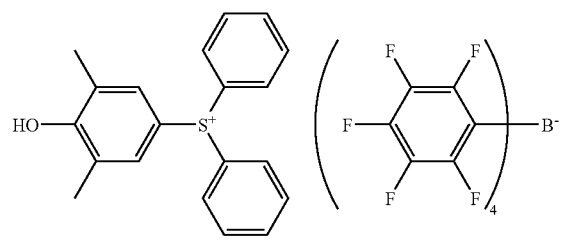
(b-22)
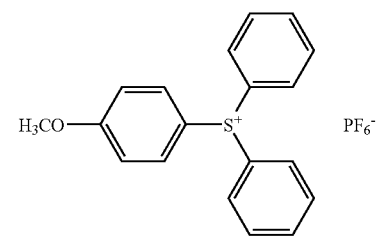
(b-23)
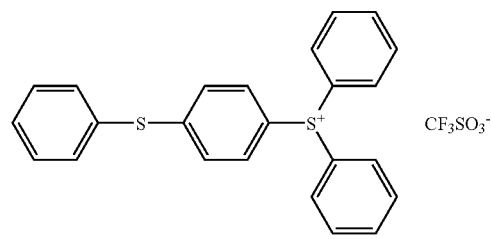
(b-24)
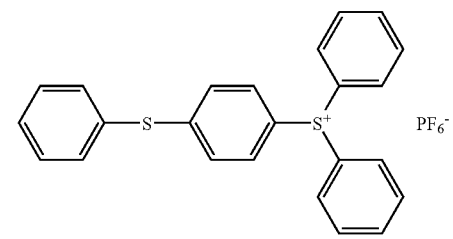
(b-25)
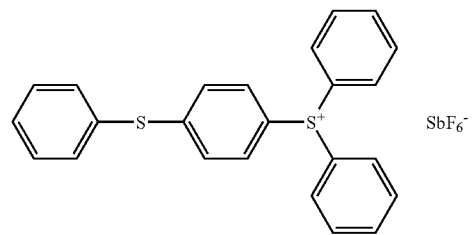
(b-26)
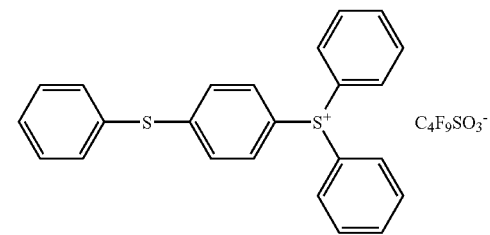
(b-27)
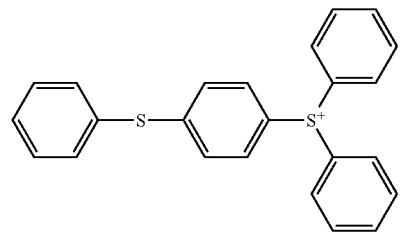
(b-28)
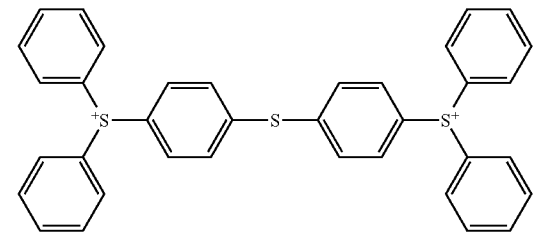
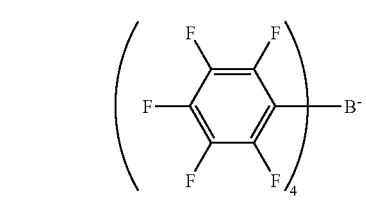
(b-29)
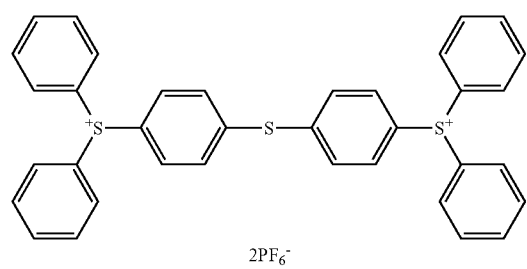
(b-30)
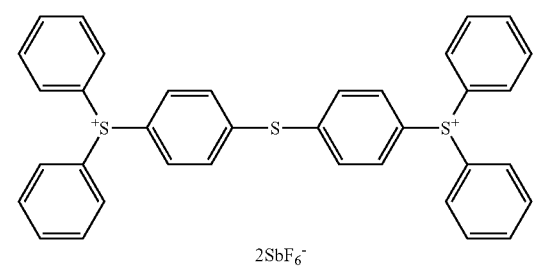

-continued
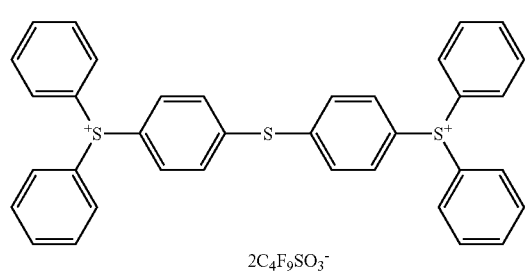
(b-31)
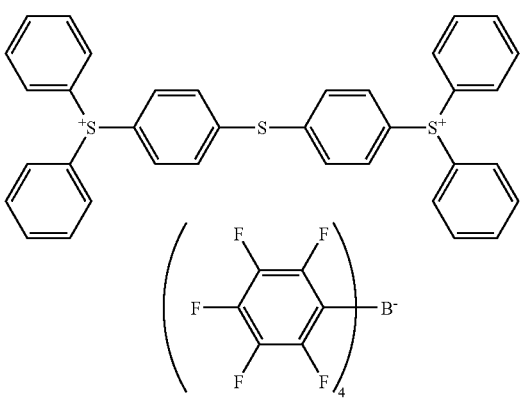
(b-32)
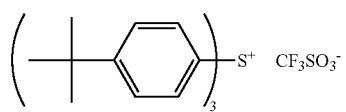
(b-33)
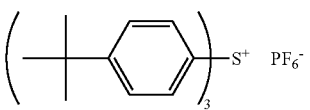
(b-34)
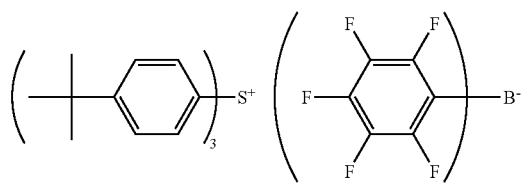
(b-35)
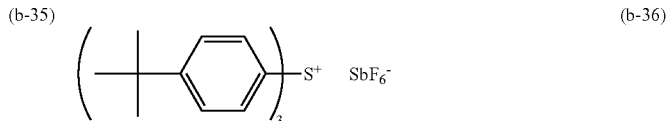
(b-36)
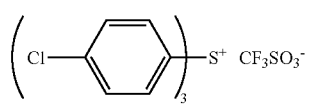
(b-37)
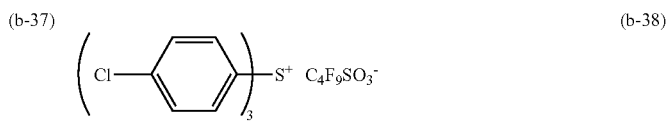
(b-38)
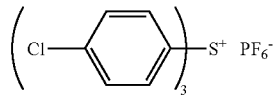
(b-39)
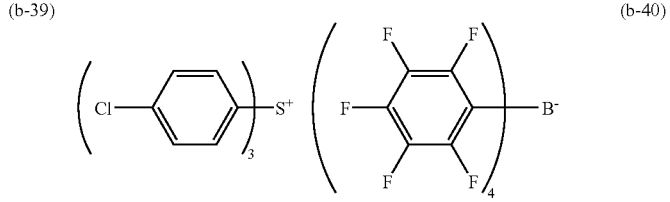
(b-40)
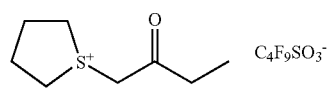
(b-41)
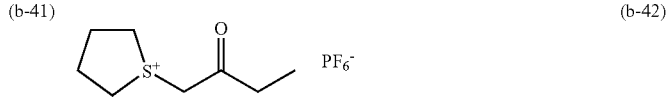
(b-42)
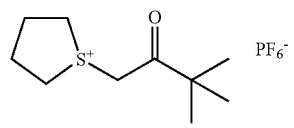
(b-43)
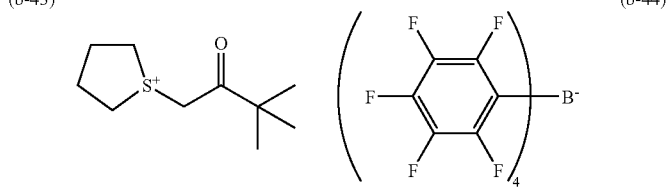
(b-44)
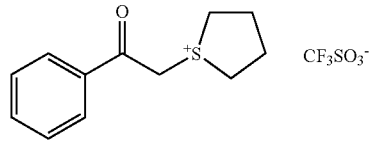
(b-45)
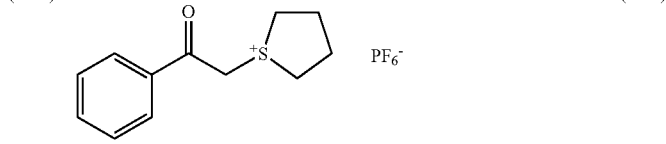
(b-46)
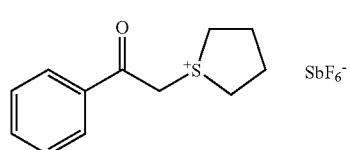
(b-47)
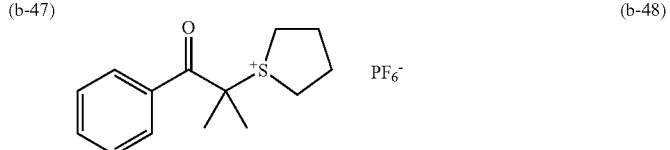
(b-48)

-continued
(b-49) 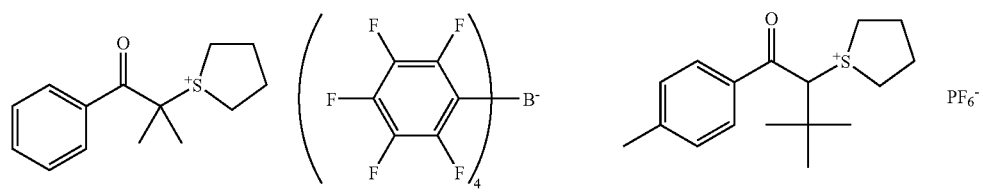 (b-50)
(b-51)  (b-52)
(b-53) 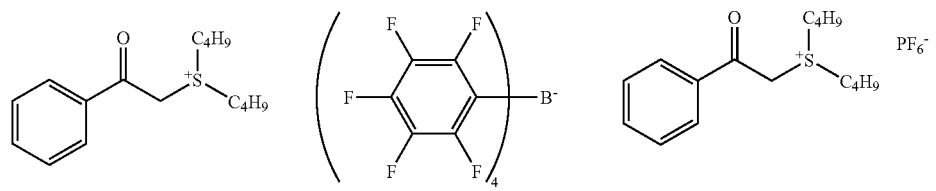 (b-54)
(b-55)  (b-56)
(b-57)  (b-58)
(b-59)  (b-60)
(b-61)  (b-62)

-continued
(b-63)
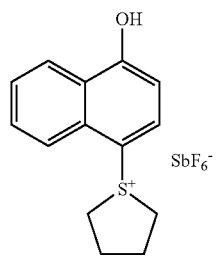
(b-64)
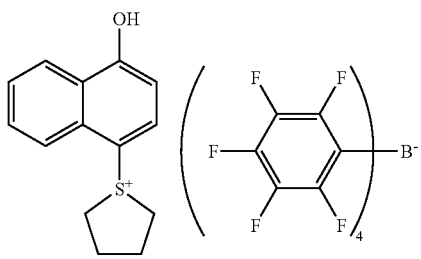
(b-65)
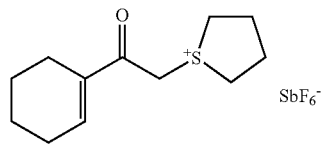
(b-66)
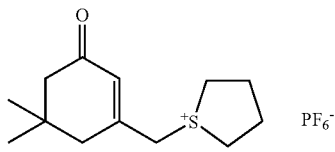
(b-67)
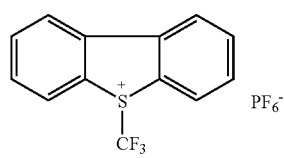
(b-68)
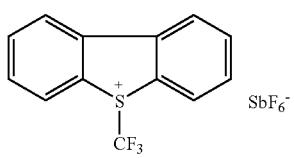
(b-69)
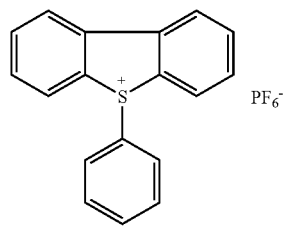
(b-70)
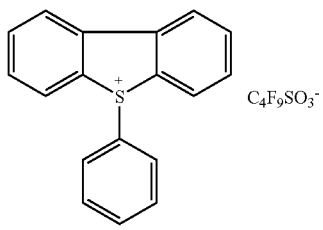
(b-71)
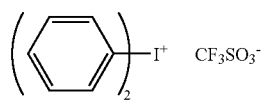
(b-72)
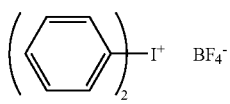
(b-73)
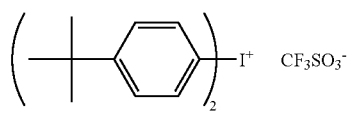
(b-74)
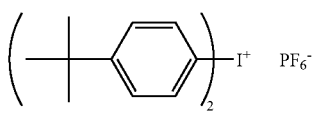
(b-75)
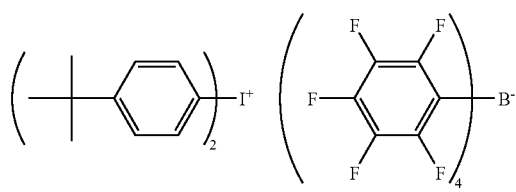
(b-76)
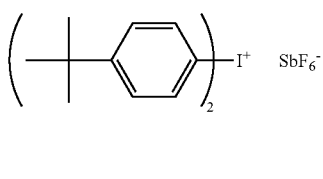
(b-77)
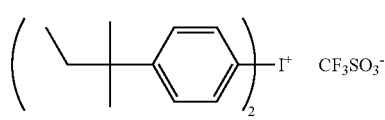
(b-78)
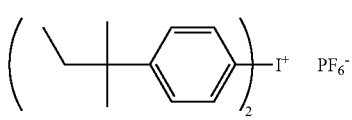
(b-79)
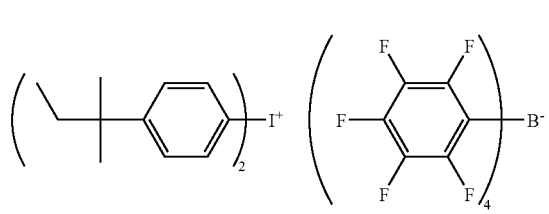
(b-80)
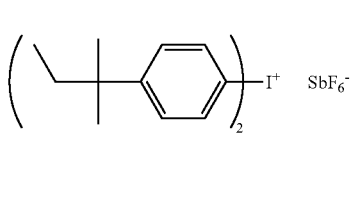

-continued
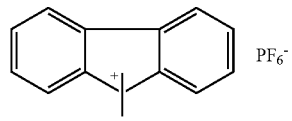 (b-81)
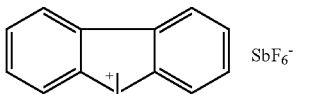 (b-82)
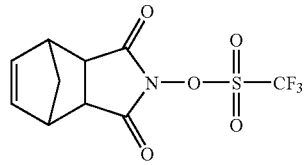 (b-83)
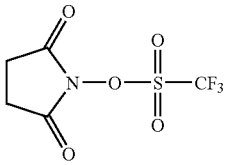 (b-84)
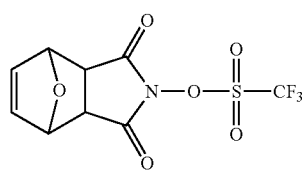 (b-85)
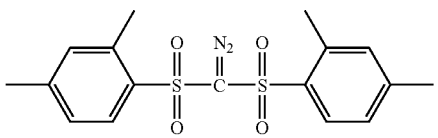 (b-86)
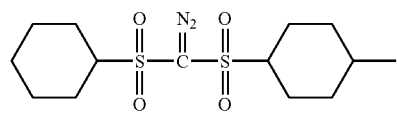 (b-87)
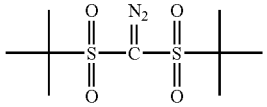 (b-88)
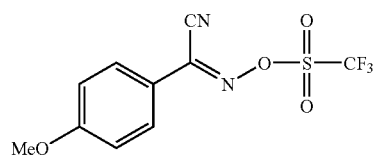 (b-89)
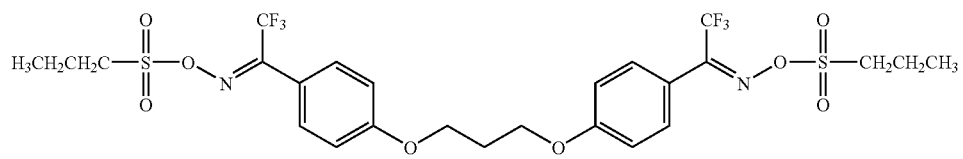 (b-90)
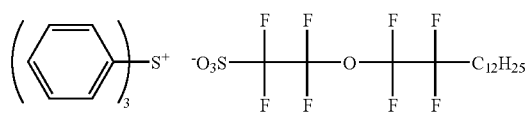 (b-91)
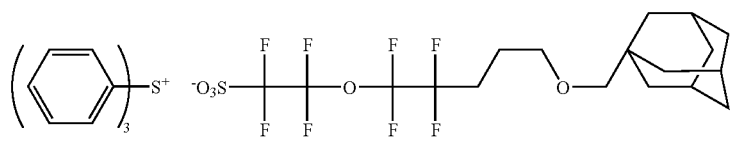 (b-92)
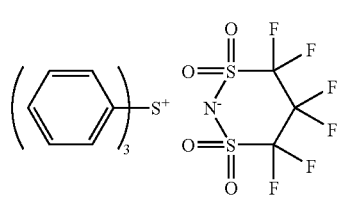 (b-93)
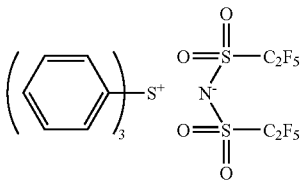 (b-94)

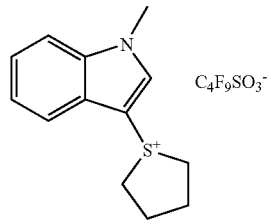 (b-95)

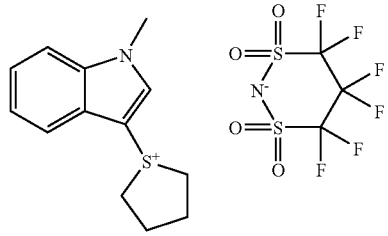 (b-96)

In addition, the oxazole derivatives, s-triazine derivatives and the like described in JP-A No. 2002-122994, paragraph [0029] and [0030], may also be used favorably.

Further, the onium salt and sulfonate compounds exemplified in JP-A No. 2002-122994, paragraph [0037] to [0063], may also be used favorably.

Among them, use of an onium salt compound having an anionic structure identical with or similar to that of the specific base compound (c) as a photochemical acid generator (b) is preferable, from the viewpoint of increasing of the curing sensitivity.

The photochemical acid generators (b) may be used alone or in combination of two or more.

The content of the photochemical acid generator (b) in the ink composition is preferably 0.1 to 20 wt %, more preferably 0.5 to 10 wt %, and still more preferably 1 to 7 wt % based on the total solid content of the ink composition.

In addition to the essential components above, various additives may be added to the ink composition according to the invention. These optional components added as needed will be described hereinafter.

[Colorant (d)]

It is possible to form a visible image by adding a colorant to the ink composition according to the invention. For example, addition of colorant is not necessarily needed for forming an image region on a planographic printing plate, but is preferable from the viewpoint of the plate-checking efficiency of the planographic printing plate obtained.

The colorant to be used is not particularly limited, and any one of known various colorants (pigments or dyes) may be used as properly selected according to applications. For example, use of a pigment is preferable for forming an image superior in weather resistance. Both water-soluble and oil-soluble dyes may be used as the dye, but an oil soluble dye is preferable.

The pigments favorably used in the invention will be described below.

(Pigment)

The pigment is not particularly limited, and examples thereof include all common commercially-available organic and inorganic pigments, dispersions of the pigments dispersed in a dispersion medium such as insoluble resin, pigments which the surface is grafted with a resin, and the like. Alternatively, for example, resin particles colored with a dye may also be used.

Such pigments include the pigments described, for example, in Seijiro Itoh Ed., "Dictionary of Pigments" (2000), W. Herbst K. Hunger, Industrial Organic Pigments", and JP-A Nos. 2002-12607, 2002-188025, 2003-26978, and 2003-342503.

Typical examples of the organic and inorganic pigments to be used in the invention include the followings: Yellow pigments including monoazo pigments such as C.I. Pigment Yellow 1 (Fast Yellow G, etc.) and C.I. Pigment Yellow 74; disazo pigments such as C.I. Pigment Yellow 12 (Disazo Yellow AAA, etc.) and C.I. Pigment Yellow 17; non-benzidine azo pigments such as C.I. Pigment Yellow 180; azolake pigments such as C.I. Pigment Yellow 100 (tartrazine yellow lake, etc.); condensation azo pigments such as C.I. Pigment Yellow 95 (Condensation Azo Yellow GR, etc.); acidic-dye lake pigments such as C.I. Pigment Yellow 115 (quinoline yellow lake, etc.); basic-dye lake pigments such as C.I. Pigment Yellow 18 (thioflavin lake, etc.); anthraquinone pigments such as fravantrone yellow (Y-24); isoindolinone pigments such as Isoindolinone Yellow 3RLT (Y-110); quinophthalone pigments such as quinophthalone yellow (Y-138); isoindoline pigments such as isoindoline yellow (Y-139); nitroso pigments such as C.I. Pigment Yellow 153 (nickel nitroso yellow, etc.); metal complex salt azomethine pigments such as C.I. Pigment Yellow 117 (copper azomethine yellow, etc.); and the like.

Red or magenta pigments including monoazo pigments such as C.I. Pigment Red 3 (toluidine red, etc.); disazo pigments such as C.I. Pigment Red 38 (pyrazolone red B, etc.); azolake pigments such as C.I. Pigment Red 53:1 (lake red C, etc.) and C.I. Pigment Red 57:1 (Brilliant Carmine 6B); condensation azo pigments such as C.I. Pigment Red 144 (Condensation Azo Red BR, etc.); acidic-dye lake pigments such as C.I. Pigment Red 174 (Phloxine B lake, etc.); basic dye lake pigments such as C.I. Pigment Red 81 (Rhodamine 6G' Lake, etc.); anthraquinone pigments such as C.I. Pigment Red 177 (dianthraquinolyl red, etc.); thioindigo pigments such as C.I. Pigment Red 88 (Thioindigo Bordeaux, etc.); perynone pigments such as C.I. Pigment Red 194 (perynone red, etc.); perylene pigments such as C.I. Pigment Red 149 (perylene scarlet, etc.); quinacridone pigments such as C.I. Pigment Violet 19 (unsubstituted quinacridone) and C.I. Pigment Red 122 (quinacridone magenta, etc.); isoindolinone pigments such as C.I. Pigment Red 180 (Isoindolinone Red 2BLT, etc.); alizarin lake pigments such as C.I. Pigment Red 83 (madder lake, etc.); and the like.

Blue or cyan pigments including disazo pigments such as C.I. Pigment Blue 25 (dianisidine blue, etc.); phthalocyanine pigments such as C.I. Pigment Blue 15 (phthalocyanine blue, etc.); acidic-dye lake pigments such as C.I. Pigment Blue 24 (peacock blue lake, etc.); basic dye lake pigments such as C.I. Pigment Blue 1 (Victria Pure Blue BO lake, etc.); anthraquinone pigments such as C.I. Pigment Blue 60 (indanthron blue, etc.); alkali blue pigments such as C.I. Pigment Blue 18 (Alkali Blue V-5:1); and the like.

The green pigments including phthalocyanine pigments such as C.I. Pigment Green 7 (phthalocyanine green) and C.I. Pigment Green 36 (phthalocyanine green); azo metal complex pigments such as C.I. Pigment Green 8 (nitroso green); and the like.

The orange pigments including isoindoline pigments such as C.I. Pigment Orange 66 (isoindoline orange); anthraquinone pigments such as C.I. Pigment Orange 51 (dichloropyranthron orange); and the like.

The black pigments including carbon black, titanium black, aniline black, and the like.

Typical examples of white pigments include basic lead carbonate ($2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white), and the like.

Titanium oxide has a lower density and a higher refractive index than other white pigments, is more stable chemically or physically, and thus, has a greater masking and coloring potential as a pigment, and is excellent in resistance to acid or alkali and other environmental factors. Thus, use of titanium oxide as the white pigment is preferable. Other white pigments (including white pigments other than those described above) may be used as needed.

For dispersing the pigment, any one of dispersing machines, such as ball mill, sand mill, attriter, roll mill, jet mill, homogenizer, paint shaker, kneader, agitator, Henschel mixer, colloid mill, ultrasonic wave homogenizer, pearl mill, and wet jet mill, may be used. It is also possible to add a dispersant during dispersion of the pigment.

Examples of the dispersants include hydroxyl group-containing carboxylic esters, salts of a long-chain polyaminoamide with a high-molecular acid ester, high-molecular polycarboxylic acid salts, high-molecular unsaturated acid esters, copolymers, modified polyacrylates, aliphatic polyvalent carboxylic acids, naphthalenesulfonic acid/formalin condensates, polyoxyethylene alkyl phosphoric esters, pigment derivatives, and the like. Use of a commercially available polymer dispersant, for example a Solsperse series product of Zeneca, is also preferable.

It is also possible to use a synergist suitable for the pigment used as the dispersion aid. These dispersants and dispersion aids are preferably added in an amount of 1 to 50 parts by weight relative to 100 parts by weight of the pigment.

In the ink composition, a solvent may be added, or the cationically polymerizable compound (a) above, which is a low-molecular weight component, may be used without solvent, as the dispersion medium for various components such as pigment, but the ink composition according to the invention preferably contains no solvent, because the composition is a radiation-curable ink that is hardened after applied on a recording medium. It is because the solvent remaining in the hardened ink image leads to deterioration in solvent resistance and causes a problem of VOC (Volatile Organic Compound). Thus, selection of a cationically polymerizable compound (a), in particular a cationic-polymerization monomer lowest in viscosity among them, as the dispersion medium is preferable, for improvement in dispersibility and handling efficiency of the ink composition.

The average diameter of the pigment is preferably in the range of 0.02 to 0.4 μm, more preferably 0.02 to 0.1 μm, and still more preferably, 0.02 to 0.07 μm.

The pigment, the dispersant, and dispersion medium are selected and the dispersion and filtration conditions are determined in such a manner that the average diameter of the pigment particles falls in the preferable range above. Control of particle diameter enables prevention of the clogging in head nozzles and preservation of the storage stability, transparency and curing sensitivity of ink.

The colorant is preferably added in an amount of 1 to 20 wt %, more preferably 2 to 10 wt % based on the total solid content of the ink composition.

(Dye)

The dye to be used in the invention is preferably an oil-soluble dye. Specifically, the dye preferably has a solubility in water (weight of the colorant dissolved in 100 g of water) of 1 g or less at 25° C., preferably 0.5 g or less, and more preferably 0.1 g or less. Accordingly, so-called water-insoluble and oil-soluble dyes are used favorably.

As for the dyes to be used in the invention, it is preferable to introduce an oil-solubilizing group on the basic dye structure described above, to ensure that the dye is dissolved in the amount needed in the ink composition.

Examples of the oil-solubilizing groups include long-chain branched alkyl groups, long-chain branched alkoxy groups, long-chain branched alkylthio groups, long-chain branched alkylsulfonyl groups, long-chain branched acyloxy groups, long-chain branched alkoxycarbonyl groups, long-chain branched acyl groups, long-chain branched acylamino groups, long-chain branched alkylsulfonylamino groups, long-chain branched alkylaminosulfonyl groups, as well as aryl, aryloxy, aryloxycarbonyl, arylcarbonyloxy, arylaminocarbonyl, arylaminosulfonyl, and arylsulfonylamino groups containing these long-chain branched substituent groups, and the like.

Alternatively, it is also possible to introduce an oil-solubilizing group, such as alkoxycarbony, aryloxycarbonyl, alkylaminosulfonyl or arylaminosulfonyl, on water-soluble dyes containing carboxylic acid or sulfonic acid groups, by using a long-chain branched alcohol, amine, phenol, or aniline derivative.

The oil-soluble dye preferably has a melting point of 200° C. or lower, more preferably 150° C. or lower, and still more preferably 100° C. or lower. Use of a low-melting point oil-soluble dye enables restriction of crystal precipitation of the colorant in the ink composition and improvement in storage stability of the ink composition.

The dye preferably has a high oxidation potential, because it improves resistance to deterioration of color, in particular by oxidative substances such as ozone. Thus, the oil-soluble dye to be used in the invention preferably has an oxidation potential of 1.0 V or more (vs. SCE). The oxidation potential is preferably higher, and thus a dye having an oxidation potential of 1.1 V or more (vs. SCE) is more preferably, and that of 1.15 V or more (vs. SCE) particularly preferable.

The yellow dyes having the structure of Formula (Y-I) described in JP-A No. 2004-250483 are preferable.

Example of the dyes particularly preferable include the dyes of Formulae (Y-II) to (Y-IV) in JP-A No. 2004-250483, paragraph [0034], and typical examples thereof include the compounds described in JP-A No. 2004-250483, paragraph [0060] to [0071]. The oil-soluble dyes of Formula (Y-I) described therein may be used not only in yellow ink, but also in inks in any other colors such as black and red.

The compounds having the structures represented by Formulae (3) and (4) in JP-A No. 2002-114930 are preferable as the magenta dyes; and typical examples thereof include the compounds described in JP-A No. 2002-114930, paragraph [0054] to [0073].

Particularly preferable dyes are the azo dyes represented by Formulae (M-1) to (M-2) in JP-A No. 2002-121414, paragraph [0084] to [0122], and typical examples thereof include the compounds described in JP-A No. 2002-121414, paragraph [0123] to [0132]. The oil-soluble dyes represented by Formulae (3), (4), and (M-1) to (M-2) may be used not only in magenta ink, but also in inks in any other colors such as black and red inks.

Favorable as the cyan dyes are the dyes represented by Formulae (I) to (IV) in JP-A No. 2001-181547 and the dyes represented by Formulae (IV-1) to (IV-4) in JP-A No. 2002-121414, paragraph [0063] to [0078], and typical examples thereof include the compounds described in JP-A 2001-181547, paragraph [0052] to [0066] and in JP-A 2002-121414, paragraph [0079] to [0081].

Particularly preferable dyes are the phthalocyanine dyes of Formulae (C-I) and (C-II) described in JP-A No. 2002-121414, paragraph [0133] to [0196]; and still more preferable are the phthalocyanine dyes represented by Formula (C-II). Typical examples thereof include the compounds described in JP-A No. 2002-121414, paragraph [0198] to [0201]. The oil-soluble dyes represented by Formulae (I) to (IV), (IV-1) to (IV-4), (C-I), and (C-II) may be used not only in cyan ink, but also in inks in any other colors such as black and green inks.

—Oxidation Potential—

The oxidation potential value (Eox) of the dye in the invention can be determined easily by those skilled in the art. These methods are described, for example, in P. Delahay, "New Instrumental Method in Electrochemistry" (1954, Interscience Publishers), A. J. Bard et al., "Electrochemical Methods" (1980, John Wiley & sons), and Akira Fujishima et al., "Electrochemical Measurement Methods" (1984, Gihodo Shuppan).

Specifically, the oxidation wave is obtained by dissolving a test sample at a concentration of $1 \times 10^{-2}$ to $1 \times 10^{-6}$ mole/liter in a solvent such as dimethylformamide or acetonitrile containing a supporting electrolyte such as sodium perchlorate or tetrapropylammonium perchlorate; by assuming that the oxidation wave obtained by applying a voltage to the anodic side (higher side) by using carbon (GC) as the working electrode and a revolving platinum electrode as the counter electrode in a cyclic voltametric or direct-current polarographic apparatus is a straight line, determining the point of intersection between the straight line of oxidation wave and that of residual current-potential and the intersection between the straight line of oxidation wave and that of saturated current (or, the intersection thereof with the straight line in parallel with the vertical line passing through the peak electric potential); and determining the voltage vs. SCE (saturated calomel electrode) at the center of the line connecting the two intersections. The value may deviate to an extent approximately of several dozen millivolts under the influence of the difference in voltage between liquids and the resistivity of the sample solution, but it is possible to assure the reproducibility of the electric potential by using a standard sample (e.g., hydroquinone). The supporting electrolyte and the solvent for use may be selected properly according to the oxidation potential and solubility of the test sample. The supporting electrolyte and the solvent for use are described in Akira Fujishima et al., "Electrochemical Measurement Methods" (1984, Gihodo Shuppan) pp. 101 to 118.

[Other Component]

Hereinafter, various additive used as needed will be described.

(Ultraviolet Absorbent)

An ultraviolet absorbent may be added to the ink composition according to the invention, for improvement in the weather fastness and prevention of the discoloration of the image obtained.

Examples of the ultraviolet absorbents include the benzotriazole compounds described in JP-A Nos. 58-185677, 61-190537, 2-782, 5-197075 and 9-34057 and others; the benzophenone compounds described in JP-A Nos. 46-2784 and 5-194483, U.S. Pat. No. 3,214,463, and others; the cinnamic acid compounds described in JP-B Nos. 48-30492 and 56-21141, JP-A No. 10-88106, and others; the triazine compounds described in JP-A Nos. 4-298503, 8-53427, 8-239368, 10-182621, and 8-501291, and others; the compounds described in Research Disclosure No. 24239; compounds emitting light by absorbing ultraviolet ray such as stilbene and benzoxazole compounds; so-called fluorescent brighteners; and the like. The addition amount may be decided suitably according to applications, but is generally, approximately 0.5 to 15 wt % based on the solid content.

(Sensitizer)

A sensitizer may be added to the ink composition according to the invention, for improvement in the acid-generating efficiency of photochemical acid generator and for raising sensitization wavelength. The sensitizer is not particularly limited, if it sensitizes the photochemical acid generator in the electron- or energy-transfer mechanism. Favorable examples thereof include aromatic fused-ring compounds such as anthracene, 9,10-dialkoxyanthracene, pyrene, and perylene; aromatic ketone compounds such as acetophenone, benzophenone, thioxanthone, and Michler's ketone; and heterocyclic ring compounds such as phenothiazine and N-aryloxasolidinones. The addition amount is decided properly according to applications, but generally, 0.01 to 1 mol %, preferably 0.1 to 0.5 mol %, relative to the photochemical acid generator.

(Antioxidant)

An antioxidant may be added, for improvement of the stability of the ink composition. Examples of the antioxidants include those described in EP Laid-Open Nos. 223739, 309401, 309402, 310551, 310552, and 459416, German Patent Laid-Open No. 3435443, JP-A Nos. 54-48535, 62-262047, 63-113536, 63-163351, 2-262654, 2-71262, 3-121449, 5-61166, and 5-119449, U.S. Pat. Nos. 4,814,262 and 4,980,275, and others. The addition amount is decided properly according to applications, but generally, approximately 0.1 to 8 wt % as solid content.

(Discoloration Inhibitor)

Any one of various organic and metal complex-based discoloration inhibitors may be used in the ink composition according to the invention. Examples of the organic discoloration inhibitor include hydroquinones, alkoxyphenols, dialkoxyphenols, phenols, anilines, amines, indanes, chromanes, alkoxyanilines, heterocyclic rings, and the like. Examples of the metal-complex discoloration inhibitors include nickel complexes, zinc complexes, and the like; and typical examples thereof include the compounds described in the patents cited in Research Disclosure No. 17643 (sections VII-I to J), ibid., No. 15162, ibid., No. 18716 (left column on p. 650), ibid., No. 36544 (p. 527), ibid., No. 307105 (p. 872), and ibid., No. 15162; and the compounds included in the Formula of typical compounds and the exemplary compounds described in JP-A No. 62-215272, pp. 127 to 137. The addition amount is decided properly according to applications, but generally, approximately 0.1 to 8 wt % as solid content.

(Conductive Salt)

A conductive salt such as potassium thiocyanate, lithium nitrate, ammonium thiocyanate, or dimethylamine hydrochloride may be added to the ink composition according to the invention, for control of the physical properties during ejection.

(Solvent)

Addition of an extremely trace amount of organic solvent to the ink composition according to the invention is effective for improvement in adhesiveness to the recording medium.

Examples of the solvents include ketone solvents such as acetone, methylethylketone, and diethylketone; alcohol solvents such as methanol, ethanol, 2-propanol, 1-propanol, 1-butanol, and tert-butanol; chlorine-based solvents such as chloroform, and methylene chloride; aromatic solvents such as benzene and toluene; ester solvents such as ethyl acetate, butyl acetate, and isopropyl acetate; ether solvents such as diethyl ether, tetrahydrofuran, and dioxane; glycol ether solvents such as ethylene glycol monomethyl ether and ethylene glycol dimethyl ether; and the like.

In such a case, the amount of the solvent added is in the range that does not cause problems of solvent resistance and VOC, and thus, preferably in the range of 0.1 to 5 wt %, more preferably 0.1 to 3 wt %, in the entire ink composition.

(Polymer Compound)

Various polymer compounds may be added to the ink composition, for adjustment of film physical properties. Examples of the polymer compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinyl resins, acrylic resins, rubber resin, waxes, other natural resins, and the like. These resins may be used in combination of two or more. Among them, vinyl copolymers obtained by copolymerization with an acrylic monomer are preferable. In addition, copolymers containing a "carboxyl group-containing monomer", an "alkyl methacrylate", or an "alkyl acrylate" as the structural unit in a copolymerization component are also used favorably for the polymer binding material.

(Surfactant)

The surfactants include those described in JP-A Nos. 62-173463 and 62-183457. Examples thereof include anionic surfactants such as dialkylsulfosuccinic acid salts, alkylnaphthalenesulfonic acid salts, and fatty acid salts; nonionic surfactants such as polyoxyethylene alkyl ethers, polyoxyethylene alkyl allyl ethers, acetylene glycols, and polyoxyethylene-polyoxypropylene block copolymers; cationic surfactants such as alkylamine salts and quaternary ammonium salts; and the like. An organic fluorocompound may be used instead of the surfactant. The organic fluorocompound is preferably hydrophobic. Examples of the organic fluorocompounds include fluorine type surfactants, oily fluorine type compounds (e.g., fluorine oil) and solid fluorine type compound resins (e.g., tetraethylenefluoride resin); and typical examples thereof include those described in JP-B No. 57-9053 (Columns 8 to 17) and JP-A No. 62-135826.

In addition, a leveling additive, a matting agent, a wax for adjustment of film physical properties, or a tackifier for improvement of the adhesiveness to the recording medium such as of polyolefin and PET that does not inhibit polymerization may be added to the ink composition according to the invention, as needed.

Typical examples of the tackifiers include the high-molecular weight adhesive polymers described in JP-A 2001-49200, pp. 5 to 6 (e.g., copolymers of a (meth)acrylic acid and an alcohol with an alkyl group having 1 to 20 carbon atoms, of a (meth)acrylic acid and an alicyclic alcohol having 3 to 14 carbon atoms, and of a (meth)acrylic acid and an aromatic alcohol having 6 to 14 carbon atoms), and low-molecular weight adhesive resin containing a polymerizable unsaturated bond, and the like.

Considering the ejection efficiency when applied to inkjet recording, the ink composition according to the invention preferably has an ink viscosity of 7 to 30 mPa·s, more preferably 7 to 20 mPa·s, at the ejection temperature, and thus, it is preferable to adjust and determine the composition ratio properly so that the viscosity falls in the range. The viscosity of the ink composition at 25 to 30° C. is 35 to 500 mPa·s and preferably 35 to 200 mPa·s. By increasing the viscosity at room temperature, it possible to prevent penetration of ink into recording medium even when a porous recording medium is used, reduce the amount of monomer unhardened and odor, suppress ink bleeding when an ink droplet is ejected, and consequently improve the image quality. An ink viscosity of lower than 35 mPa·s at 25 to 30° C. is not effective in preventing ink bleeding, while an ink viscosity of more than 500 mPa·s leads to a problem in ink delivery.

The surface tension of the ink composition according to the invention is preferably 20 to 30 mN/m and more preferably 23 to 28 mN/m. When the ink is applied on various recording medium such as polyolefin, PET, coated paper, and non-coated paper, the surface tension is preferably 20 mN/m or more for prevention of ink bleeding and penetration, and 30 mN/m or less for improvement in compatibility therewith.

The ink composition according to the invention thus adjusted is used favorably as an inkjet recording ink. The ink composition is ejected onto a recording medium by an inkjet printer, and the ink composition ejected is hardened for recording by irradiation of a radiation ray.

The printed material obtained with the ink is superior in the strength of the image area which is hardened by irradiation of a radiation ray such as ultraviolet ray, and thus can be used not only for image forming but also in various applications, for example, in formation of an ink receiving layer (image area) of planographic printing plate.

(Inkjet Recording Method and Inkjet Recording Apparatus)

The inkjet recording method and the inkjet recording apparatuses according to the present invention, and the recording method is applicable will be described below.

In the inkjet recording method, it is preferable to eject the ink composition after the viscosity of ink composition is lowered to 7 to 30 mPa·s by heating to 40 to 80° C., and in this manner, it is possible to realize ejection stability. Generally, radiation-curable ink compositions are usually more viscous than aqueous inks, and the fluctuation in the viscosity of radiation-curable ink compositions caused by the variation of temperature during printing is enhanced. The fluctuation in the viscosity of ink composition exerts significant influences on the droplet size and the droplet injection speed, causing deterioration in image quality, and thus, it is necessary to keep the temperature of the ink composition as constant as possible during printing. The range of temperature of the ink composition to be controlled is preferably, temperature setting±5° C., more preferably temperature setting±2° C., and still more preferably temperature setting±1° C.

The inkjet recording apparatus characteristically has the means of stabilizing the temperature of ink composition, and all pipings and parts from ink tank (intermediate tank if present) to nozzle injection face are controlled to a particular constant temperature.

The method of controlling temperature is not particularly limited, but, for example, each piping unit is preferably monitored by multiple temperature sensors, and heated for control of the temperature properly according to the flow of ink and environment temperature. In addition, the head unit to be heated is preferably, thermally insulated or protected, for prevention of the environmental influence on the apparatus. It is preferable to insulate the heating unit from other units and reduce the heat capacity of the entire heated unit, for shortening the start-up time needed for heating or for reducing the loss in heat energy.

Irradiation conditions will be described hereinafter. A basic irradiation method is disclosed in JP-A No. 60-132767. Specifically, two radiation sources are placed at both side of a head unit, and the ink composition is ejected, while the head unit and the radiation sources are scanned in the shuttle mode. The ink composition is irradiated after a particular period from when the composition is ejected on the recording medium. In addition, hardening of the ink composition is completed by irradiation from another radiation source that is not driven. WO 99/54415 discloses irradiation methods of using an optical fiber and irradiating UV ray on a recording area (region where ink composition is ejected) by guiding a collimated radiation source to a mirror surface on the side wall of head unit. These irradiation methods may be used in the invention.

It is also preferable in the invention to heat the ink composition to a particular temperature and make the period from ejection to irradiation to 0.01 to 0.5 second, more preferably 0.01 to 0.3 second, and still more preferably 0.01 to 0.15 second. By controlling the period from ejection to irradiation to an extremely short period, it becomes possible to prevent ink bleeding before hardening of the ejected ink. It also becomes possible to irradiate an ink composition before penetration thereof into the depth to which no light beam from radiation source is penetrable even on a porous recording medium, suppress the amount of residual unreacted monomer, and consequently, reduce odor. The inkjet recording method described above and the ink composition according to the invention provides a synergic effect when used in combination. In particular, use of an ink composition having an ink viscosity of 35 to 500 MP·s at 25° C. is very effective. By using such a recording method, it is possible to make the dot diameter of ejected ink composition as constant as possible and thus obtain an image improved in quality, even on various recording medium which are different in surface wettability. For obtaining a color image, it is preferable to form images one by one from a color image lower in lightness. If inks lower in lightness are superimposed, the radiation ray does not easily reach to the lower ink, often leading to deterioration in curing sensitivity, increase in the amount of residual monomer, generation of odor, and deterioration in adhesiveness. Although it is possible to subject irradiation exposure on a full-color image simultaneously, it is preferable to subject irradiation exposure on each color image in sequence for acceleration of hardening.

The inkjet recording apparatus to be used in the invention is not particularly limited, and any one of commercially available inkjet recording apparatuses may be used. That is, in the invention, an image can be recorded on recording medium by any one of commercially available inkjet recording apparatuses.

(Recording Medium)

The recording medium, to which the ink composition according to the invention is applicable, is not particularly limited, and include common papers such as non-coated and coated papers, various non-absorptive resin materials for use in so-called soft packaging, and resin films thereof in the film shape; and examples of the various plastic films include PET film, OPS film, OPP film, ONy film, PVC film, PE film, TAC film, and the like. Examples of the other plastics for use as the recording medium material include polycarbonate, acrylic resins, ABS, polyacetal, PVA, rubbers, and the like. In addition, metal and glass are also usable as the recording medium.

The ink composition according to the invention, which is resistant to heat shrinkage during hardening and superior in adhesiveness to the base material (recording medium), has an advantage of allowing formation of an high-definition image even on films easily curled or deformed, for example by hardening and shrinkage of ink or the heat during curing reaction, such as thermally shrinkable PET film, OPS film, OPP film, ONy film, and PVC film.

[Planographic Printing Plate]

A favorable application of the ink composition according to the invention is planographic printing plate. A planographic printing plate is prepared by ejecting the ink composition according to the invention on a hydrophilic support, for example, by an inkjet recording apparatus and hardening the ink composition and forming a hydrophobic region by irradiation exposure. When an ink and an aqueous component is supplied thereto, the aqueous component is held in the region exposed on the hydrophilic support while the ink is held in the hydrophobic region; and the recording medium can be used as it is in the printing step.

Because the ink composition according to the invention has superior curing sensitivity by irradiation, the planographic printing plate according to the invention on which the ink composition is applied has an image area superior in printing durability. In addition, it is possible to form a high-definition image area on the planographic printing plate directly from digital data by using the inkjet recording method.

The ink composition according to the invention described above may be used as it is as the ink composition for use in preparing a planographic printing plate.

(Support)

The support favorably used in preparation of the planographic printing plate according to the invention will be described hereinafter.

The support for use in preparation of the planographic printing plate according to the invention is not particularly limited, and may be any one of dimensionally stable plate-shaped supports. Any material may be used as it is for the support if it is hydrophilic on the surface, and the plate-shaped support may be subjected to a hydrophilizing treatment of the surface.

Examples of the materials for the support include papers, papers laminated with a plastic material (e.g., polyethylene, polypropylene, or polystyrene), metal plates (e.g., aluminum, zinc and copper), plastic films (e.g., cellulose diacetate, cellulose triacetate, cellulose propionate, cellulose butyrate, cellulose acetate, cellulose lactate, cellulose nitrate, polyethylene terephthalate, polyethylene, polystyrene, polypropylene, polycarbonate, and polyvinylacetal), papers or plastic films laminated or deposited with the metal described above, and the like. Preferable supports include polyester film and aluminum plate. Among them, aluminum plate, which is superior in dimensional stability and relatively cheaper, is more preferable.

Favorable aluminum plates are pure aluminum plates and alloy plates containing aluminum as the main component and small amounts of foreign elements, or may be plastic films laminated or deposited with aluminum. The foreign elements in the aluminum alloys include silicon, iron, manganese, copper, magnesium, chromium, zinc, bismuth, nickel, and titanium. The content of the foreign elements in the alloy is preferably 10 wt % at the maximum. Although pure aluminum is most preferable in the invention, the aluminum plate may contain a small amount of foreign elements, because it is difficult to prepare completely pure aluminum due to the problems in refining process. The composition of the aluminum plate is not particularly limited, and any one of known raw materials commonly used may be used.

The thickness of the support is preferably 0.1 to 0.6 mm and more preferably 0.15 to 0.4 mm.

The aluminum plate is preferably subjected to a surface finishing treatment such as surface-roughening treatment or anodizing treatment before use. Hydrophilicity of the recording medium and adhesion between the image-recording layer and the support are improved by the surface finishing. Before the surface-roughening treatment, the aluminum plate is subjected to a degreasing treatment, for example, with a surfactant, organic solvent, aqueous alkaline solution, or the like for removal of the rolling oil on surface.

Various methods may be used for surface roughening of aluminum plate, and examples thereof include mechanical surface-roughening treatment, electrochemical surface-roughening treatment (surface-roughening by dissolving the surface electrochemically), and chemical surface-roughening treatment (surface-roughening by dissolving selectively the surface with chemical treatment).

Any one of the methods known in the art such as ball polishing, brushing, blast polishing, and buffing may be used as the method of mechanical surface-roughening. Alternatively, a method of transferring surface irregularity with a surface-irregular roll during hot rolling of aluminum may be used.

The electrochemical surface-roughening may be performed, for example, by applying an alternate or direct current to the support in an electrolyte solution containing an acid such as hydrochloric acid or nitric acid. Yet alternatively, the method using a mixed acid described in JP-A No. 54-63902 may also be used.

The aluminum plate after surface-roughening treatment may be etched as needed by using an alkaline aqueous solution, for example, of potassium hydroxide or sodium hydroxide, and further after neutralization, treated as needed in an anodizing process for improvement in abrasion resistance.

Various electrolytes forming a porous oxide film may be used as the electrolytes for use in the process of anodizing aluminum plate. Sulfuric acid, hydrochloric acid, oxalic acid, chromic acid, or a mixed acid thereof is used commonly. The concentration of the electrolyte is determined properly according to the kind of electrolyte.

The condition of the anodizing process varies according to the electrolyte used, and thus is not specified particularly; but generally, the electrolyte concentration is 1 to 80 wt %; liquid temperature, 5 to 70° C.; electric current density, 5 to 60 A/dm$^2$; voltage, 1 to 100 V; and electrolysis period, 10 seconds to 5 minutes. The amount of the anodic oxide film formed is preferably 1.0 to 5.0 g/m$^2$ and more preferably 1.5 to 4.0 g/m$^2$. In the range above, it is possible to obtain a planographic printing plate favorable in printing durability and scuff resistance in the nonimage area.

The surface-finished recording medium having an anodic oxide film described above may be used as the support for use in the invention, but may be subjected to another treatment as needed, for example, the treatment for expanding or sealing the micropores in the anodic oxide film described in JP-A Nos. 2001-253181 and 2001-322365 or a surface hydrophilizing treatment of immersing it in an aqueous solution containing a hydrophilic compound, for further improvement in adhesion to the upper layer, hydrophilicity, staining resistance, heat insulation efficiency, and others. The expanding and sealing treatments are not limited to the methods described above, and any one of known methods may be used.

(Sealing)

Sealing may be performed by vapor sealing, treatment only with fluorozirconic acid, treatment with sodium fluoride sealing with an aqueous solution containing an inorganic fluorine compound, vapor sealing in the presence of lithium chloride, or sealing with hot water.

Among the methods above, sealing with an aqueous solution containing an inorganic fluorine compound, steam sealing, and hot-water sealing are preferable.

[Hydrophilizing Treatment]

The hydrophilizing treatments for use in the invention include the alkali metal silicate methods described in U.S. Pat. Nos. 2,714,066, 3,181,461, 3,280,734 and 3,902,734. In the method, the support is immersed and electrolyzed, for example, in an aqueous solution of sodium silicate. Also included are the method of treating the support with potassium fluorozirconate described in JP-B No. 36-22063 and the methods of treating it with polyvinylphosphonic acid described in U.S. Pat. Nos. 3,276,868, 4,153,461 and 4,689,272.

The support in the invention preferably has an average center-line roughness of 0.10 to 1.2 μm. In the range above, it is possible to obtain favorable adhesiveness to the recording medium, favorable printing durability, and favorable staining resistance.

Hereinafter, the present invention will be described with reference to examples, but is not limited thereto.

EXAMPLES

Example 1

Preparation of Pigment Dispersions

Pigment dispersions 1 of yellow, magenta, cyan and black in color, respectively were prepared according to the method described hereinafter. The dispersions were prepared by dispersing the ingredients in a known dispersing machine under the controlled condition making respective pigment particles have an average diameter in the range of 0.2 to 0.3 μm and then filtering the mixture under heat.

| (Yellow pigment dispersion 1) | |
|---|---|
| C.I. Pigment Yellow 12 | 10 parts by weight |
| Polymer dispersant (Solsperse series product manufactured by Zeneca) | 5 parts by weight |
| Stearyl acrylate | 85 parts by weight |
| (Magenta pigment dispersion 1) | |
| C.I. Pigment Red 57:1 | 15 parts by weight |
| Polymer dispersant (Solsperse series product manufactured by Zeneca) | 5 parts by weight |
| Stearyl acrylate | 80 parts by weight |
| (Cyan pigment dispersion 1) | |
| C.I. Pigment Blue 15:3 | 20 parts by weight |
| Polymer dispersant (Solsperse series product manufactured by Zeneca) | 5 parts by weight |
| Stearyl acrylate | 75 parts by weight |
| (Black pigment dispersion 1) | |
| C.I. Pigment black 7 | 20 parts by weight |
| Polymer dispersant (Solsperse series product manufactured by Zeneca) | 5 parts by weight |
| Stearyl acrylate | 75 parts by weight |

<<Preparation of Inks>>

An ink in each color was prepared from each of the dispersions 1 thus obtained according to the method hereinafter.

(Yellow ink 1)

(a) Cationically polymerizable compound

| | |
|---|---|
| Celoxide 2021 (epoxy compound: manufactured by Daicel-UCB Co.) | 35 g |
| OXT-221 (oxetane compound: manufactured by Toagosei Co., Ltd.) | 55 g |

(b) Photochemical acid generator

| | |
|---|---|
| Compounds (b-24)/(b-29): 1/2 | 5 g |

(c) Specific base compound

| | |
|---|---|
| Compounds (c-42)/(c-47): 1/2 | 0.05 g |

(d) Colorant (pigment dispersion above)

| | |
|---|---|
| Yellow pigment dispersion 1 | 5 g |

(Magenta ink 1)

(a) Cationically polymerizable compound

| | |
|---|---|
| Celoxide 2021 (epoxy compound: manufactured by Daicel-UCB Co.) | 35 g |
| OXT-221 (oxetane compound: manufactured by Toagosei Co., Ltd.) | 55 g |

(b) Photochemical acid generator

| | |
|---|---|
| Compound (b-5) | 5 g |

(c) Specific base compound

| | |
|---|---|
| Compound (c-25) | 0.03 g |

(d) Colorant (pigment dispersion above)

| | |
|---|---|
| Magenta pigment dispersion 1 | 5 g |

(Cyan ink 1)

(a) Cationically polymerizable compound

| | |
|---|---|
| Celoxide 2021 (epoxy compound: manufactured by Daicel-UCB Co.) | 35 g |
| OXT-221 (oxetane compound: manufactured by Toagosei Co., Ltd.) | 55 g |

(b) Photochemical acid generator

| | |
|---|---|
| Compound (b-78) | 5 g |

(c) Specific base compound

| | |
|---|---|
| Compound (c-4) | 0.03 g |

(d) Colorant (pigment dispersion above)

| | |
|---|---|
| Cyan pigment dispersion 1 | 5 g |

(Black ink 1)

(a) Cationically polymerizable compound

| | |
|---|---|
| Celoxide 2021 (epoxy compound: manufactured by Daicel-UCB Co.) | 35 g |
| OXT-221 (oxetane compound: manufactured by Toagosei Co., Ltd.) | 55 g |

(b) Photochemical acid generator

| | |
|---|---|
| Compound (b-4) | 5 g |

(c) Specific base compound

| | |
|---|---|
| Compound (c-20) | 0.03 g |

(d) Colorant (pigment dispersion above)

| | |
|---|---|
| Black pigment dispersion | 5 g |

Sensitizer

| | |
|---|---|
| 9,10-Dimethoxyanthracene | 0.5 g |

<<Inkjet Image Recording>>

(Evaluation of Multicolor Image)

Then, an image was recorded on a recording medium by using a commercially available inkjet recording apparatus equipped with a piezoelectric inkjet nozzle. The ink-supplying system consists of an ink stock tank, a supply pipe, an ink-supplying tank immediately before inkjet head, a filter, and a piezoelectric inkjet head, and the region from the ink-supplying tank to the inkjet head was insulated and heated. The temperature sensors were placed close to the ink-supplying tank and inkjet head nozzle, and the nozzle area is controlled always to a temperature of 70° C.±2° C. The piezoelectric inkjet head was driven to eject multi-sized dots in an amount of 8 to 30 pl at a resolution of 720×720 dpi. The exposure system, main scanning speed, and injection frequency were adjusted in such a manner that a UV-A beam was first irradiated at an exposure-face illuminance of 100 mW/cm$^2$ after 0.1 second from ejection of ink on the recording medium. Exposure energy was irradiated while the exposure period was made variable. The "dpi" in the invention means a dot number per 2.54 cm.

Each of the inks in various colors was ejected at an environment temperature of 25° C. repeatedly in the order of black, cyan, magenta, and yellow, and irradiated with ultraviolet light after each ejection. Each of the image was irradiated at a total exposure energy of 300 mJ/cm$^2$ per color, until complete hardening of the image, i.e., until the image felt non-tacky when stroked with finger. The image was recorded on a recording medium: a surface-roughened aluminum recording medium, a surface-finished transparent biaxially stretched polypropylene film suitable for printing, a soft vinyl chloride sheet, and a cast-coated paper, and a commercially available recycled paper; and the inks gave a favorable image without dot blurring on all of the recording medium. Even when the inks were used in forming an image on wood free paper, the inks hardened sufficiently before penetration to the rear face and did not generate the odor derived from unreacted monomer. In addition, the inks recorded on film were sufficiently flexible; and there was no crack when bent or no problem in adhesiveness in a cellophane-tape peeling test.

Examples 2 to 12 and Comparative Examples 1 and 2

Preparation of Inks

Magenta inks of Examples 2 to 12 were prepared according to the method hereinafter. An ink composition of Comparative Example 1 was obtained in a similar manner to the ink composition of Example 12, except that the composition did not contain the specific basic compound (c). In addition, an ink composition of Comparative Example 2 was obtained in a similar manner, except that the specific base compound (c) (c-12) was replaced with the same amount of a comparative basic compound (II) (octylamine) that does not become less basic by irradiation exposure.

| | |
|---|---|
| (a) Cationically polymerizable compound (compound shown in Table 1) | 90 g |
| (b) Photochemical acid generator (compound shown in Table 1) | 5 g |
| (c) Basic compound (specific base compound shown in Table 1, comparative basic compound or non-addition) | (0.03 g) |
| (d) Colorant (magenta pigment dispersion 1 above) | 5 g |

The cationically polymerizable compounds shown in Table 1 are as follows:

Cationically Polymerizable Compound (1):

Celoxide 2021 (epoxy: manufactured by Daicel-UCB Co.)/OXT-221 (oxetane: manufactured by Toagosei Co., Ltd.), 35/55 mixture Cationically Polymerizable Compound (2):
  Celoxide 3000 (epoxy: manufactured by Daicel-UCB Co.)/OXT-211 (oxetane: manufactured by Toagosei Co., Ltd.), 50/40 mixture, Cationically Polymerizable Compound (3):
  Bisphenol A-diglycidyl ether/OXT-221 (oxetane, manufactured by Toagosei Co., Ltd.), 40/50 mixture Cationically Polymerizable Compound (4):
  Celoxide 2021(epoxy: manufactured by Daicel-UCB Co.)/ OXT-101(oxetane, manufactured by Toagosei Co., Ltd.), 55/35 mixture The ink viscosity of each ink composition obtained in the Examples and Comparative Examples above at the injection temperature was in the range of 7 to 20 mP·s.

[Inkjet Image Recording]

(Evaluation of Mono-Color Image)

A magenta image was printed in a similar manner to Example 1 by using each of the magenta inks 2 to 12 thus prepared or the magenta ink 1 prepared in Example 1.

Then, as the evaluation of the inkjet image, curing sensitivity, penetrability into a commercially available recycled paper, storage stability and ink bleeding adhesiveness, and printing durability on a surface-roughened aluminum recording medium, of each of the images formed were evaluated as follows:

1. Evaluation of Curing Sensitivity

The amount of exposure energy (mJ/cm$^2$) needed to make an image surface non-tacky after UV irradiation was defined as the curing sensitivity. A smaller value indicates a higher sensitivity.

2. Evaluation of Storage Stability

Each of the inks prepared was stored at 75% RH and 60° C. for three days; the viscosity of the ink was determined at the ejection temperature; and the increase in ink viscosity was determined as the viscosity ratio, viscosity after storage/viscosity before storage. A viscosity without change or a viscosity ratio close to 1.0 indicates higher storage stability, and a viscosity ratio of less than 1.5 was regarded that the storage stability is satisfactory.

3. Evaluation of Penetrability into Commercially Available Recycled Paper

An image printed on a commercially available recycled paper was evaluated according to the following criteria:
  A: Almost no penetration and no residual monomer odor
  B: With slight penetration and slight residual monomer odor
  C: Distinct penetration of ink to the rear face side and strong residual monomer odor 4. Evaluation of Ink Bleeding on Surface-Roughened Aluminum Recording Medium An image printed on a surface-roughened aluminum support was evaluated according to the following criteria:
  A: No ink bleeding between neighboring dots
  B: Slight ink bleeding of dots
  C: Distinct ink bleeding of dots and blurring of image 5. Evaluation of Adhesiveness to Surface-Roughened Aluminum Recording Medium Two recording medium samples carrying the printed image obtained above, a sample without flaw and a sample carrying 100 square partial images that is formed by cutting the printed face at an interval of 1 mm with 11 lines both vertically and horizontally according to JIS K5400, were prepared; a cellophane tape was adhered on each of the printed faces and peeled rapidly at an angle of 90 degrees; and the appearance of the printed image or the square partial images remaining without exfoliation was evaluated according to the following criteria:
  A: No exfoliation of the printed image in tape-peeling test
  B: Slight ink separation in tape-peeling test, but almost no separation if the ink face was not cut.
  C: Image separated easily with a cellophane tape under both conditions (Evaluation of Planographic Printing Plate)

An image was formed on the surface-roughened aluminum recording medium thus prepared by using each of the ink compositions according to the invention. The recording medium was evaluated as a planographic printing plate.

a. Evaluation of Image

Printing was performed by using the planographic printing plate prepared with the ink composition according to the invention in a Heidel KOR-D printing machine, while supplying ink [VALUES-G red for sheet-fed printing press (manufactured by Dainippon Ink and Chemicals, Inc.)] and dampening water [Ecolity 2 (manufactured by Fuji Photo Film)]. The image after printing on 100 papers was evaluated visually.
  A: No whitening in image region and no stains in non-image region
  B: Slight whitening in image region and/or slight staining in non-image region.
  C: Severe whitening in image region and/or severe staining in non-image region, and thus practically problematic.

b. Evaluation of Printing Durability

The printing was continued, and the relative number of papers printable was determined (relative to 100 in Example 1). A greater value indicates a higher printing durability.

The evaluation results are summarized in Table 1.

TABLE 1

| | | Example 2 | Example 3 | Example 4 | Example 5 | Example 6 | Example 7 | Example 8 | Example 9 | Example 10 | Example 11 | Example 12 | Comparative Example 1 | Comparative Example 2 |
|---|---|---|---|---|---|---|---|---|---|---|---|---|---|---|
| Ink composition | (a) Cationically polymerizable compound | (1) | (1) | (1) | (2) | (2) | (2) | (3) | (3) | (3) | (4) | (4) | (4) | (4) |
| | (b) Photochemical acid generator | b-3 | b-5 | b-29 | b-40 | b-59 | b-74 | b-12 | b-24 | b-80 | b-82 | b-3 | b-3 | b-3 |
| | (c) Specific basic compound | c-13 | c-15 | c-47 | c-45 | c-55 | c-63 | c-33 | c-47 | c-6 | c-8 | c-12 | none | (II)* |

TABLE 1-continued

|  |  | Example 2 | Example 3 | Example 4 | Example 5 | Example 6 | Example 7 | Example 8 | Example 9 | Example 10 | Example 11 | Example 12 | Comparative Example 1 | Comparative Example 2 |
|---|---|---|---|---|---|---|---|---|---|---|---|---|---|---|
| Evaluation | Penetrability into recycled paper | A | A | A | A | B | A | A | A | A | B | A | B | B |
|  | Ink bleeding on aluminum support | A | A | A | A | A | A | A | A | A | A | B | B | B |
|  | Adhesiveness to aluminum support | A | A | A | A | A | A | A | A | A | A | A | A | A |
|  | Curing sensitivity | 300 | 300 | 350 | 350 | 300 | 300 | 350 | 300 | 300 | 350 | 350 | 400 | 500 |
|  | Ink storage stability | 1.1 | 1.1 | 1.1 | 1.1 | 1.2 | 1.1 | 1.1 | 1.2 | 1.2 | 1.1 | 1.2 | 1.8 | 1.3 |
|  | Image formed by planographic printing plate | A | A | A | A | A | A | A | A | A | A | A | A | A |
|  | Printing durability | 110 | 120 | 120 | 100 | 100 | 110 | 120 | 120 | 130 | 100 | 110 | 100 | 90 |

*In Comparative Example 2, a comparative basic compound (II) octylamine was added in the same amount, replacing the specific base compound (c).

As apparent from Table 1, the ink composition according to the invention hardened at high sensitivity by irradiation with a radiation ray, formed a high-quality image on paper in the image-forming test, and had favorable storage stability. Thus, in the invention, it was possible to improve curing sensitivity, resistance to ink bleeding on non-penetrable support, and the storage stability of ink in a balanced way.

On the other hand, the ink composition of Comparative Example 1 not containing the specific base compound (c) was inferior in storage stability and also slightly inferior either in the penetrability into recycled paper, ink bleeding on aluminum support, or curing sensitivity. Alternatively, the ink composition of Comparative Example 2, which contains a comparative basic compound, octylamine that does not become less basic by irradiation with a radiation ray replacing the specific base compound (c), was improved significantly in storage stability, but drastic deterioration in curing sensitivity was also observed.

In addition, the planographic printing plate carrying an image prepared with the ink composition according to the invention gave high-quality images and was superior in printing durability as well.

The ink composition according to the invention gives a high quality-image high-strength image in normal printing and thus high-quality prints, and thus, can be used favorably in production of resists, color filters, and optical disks and is also useful as an optical modeling material.

Further because the inkjet recording composition hardens at high sensitively even on a non-absorptive recording medium, giving a high-strength image region and allows direct printing thereon based on digital data, the ink composition according to the invention can be used favorably for preparation of a planographic printing plate, in particular a planographic printing plate having a size of A2 or larger and gives a planographic printing plate superior in printing durability.

The present invention provides an inkjet recording ink composition which is curable at high sensitivity by irradiation with a radiation ray, forms a high-quality image, and is superior in adhesiveness to the recording medium as well as storage stability, and an inkjet recording method by using the ink composition.

In addition, the print material obtained by using the ink composition, which is superior in storage stability and is curable at high sensitivity by irradiation of ultraviolet light, are superior in image quality; and the strength of the image region is also favorable. It is also possible to prepare a planographic printing plate superior in printing durability and image quality on the basis of digital data by using the ink composition according to the invention.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising (a) a cationically polymerizable oxetane compound represented by one of the following formulae (1)-(5):

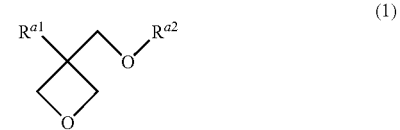

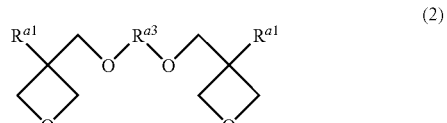

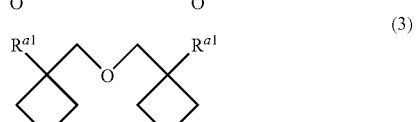

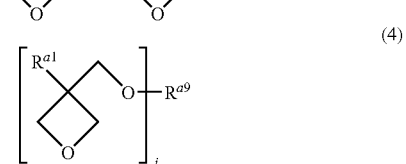

-continued

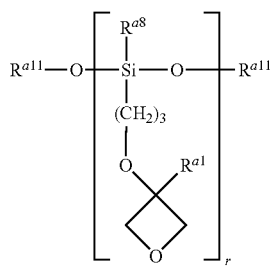
(5)

wherein $R^{a1}$ represents a hydrogen atom, an alkyl group having 1 to 6 carbon atoms, a fluoroalkyl group having 1 to 6 carbon atoms, an allyl group, an aryl group, a furyl group or a thienyl group, provided that when there are two $R^{a1}$ groups in the molecule, they may be the same as or different from each other;

$R^{a2}$ represents a hydrogen atom, an alkyl group having 1 to 6 carbon atoms, an alkenyl group having 2 to 6 carbon atoms, an aromatic ring-containing group, an alkylcarbonyl group having 2 to 6 carbon atoms, an alkoxycarbonyl group having 2 to 6 carbon atoms, or an N-alkylcarbamoyl group having 2 to 6 carbon atoms;

$R^{a3}$ represents a linear or branched alkylene group, a linear or branched poly(alkyleneoxy) group, a linear or branched unsaturated hydrocarbon group, a carbonyl group or a carbonyl group-containing alkylene group, a carboxyl group-containing alkylene group, a carbamoyl group-containing alkylene group, or one of the following groups:

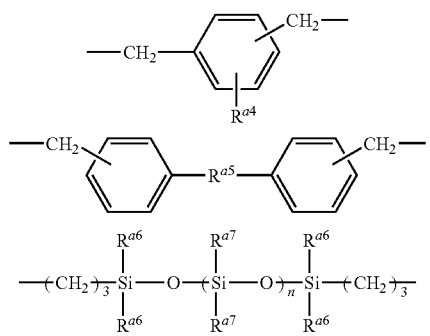

wherein $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkylcarboxyl group, a carboxyl group, or a carbamoyl group;

$R^{a5}$ represents an oxygen or sulfur atom, a methylene group, NH, SO, $SO_2$, $C(CF_3)_2$, or $C(CH_3)_2$;

$R^{a6}$ represents an alkyl group having 1 to 4 carbon atoms or an aryl group;

n is an integer of 0 to 2,000;

$R^{a7}$ represents an alkyl group having 1 to 4 carbon atoms, an aryl group, or a monovalent group having the following structure:

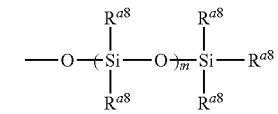

wherein $R^{a8}$ represents an alkyl group having 1 to 4 carbon atoms or an aryl group;

m is an integer of 0 to 100;

$R^{a9}$ represents a connecting group;

j is 3 or 4;

$R^{a11}$ represents an alkyl group having 1 to 4 carbon atoms or a trialkylsilyl group; and r is 1 to 4, (b) a compound that generates an acid upon irradiation with a radiation ray represented by one of the following formulae (b1) and (b2):

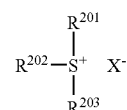
(b1)

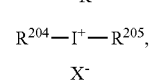
(b2)

wherein $R^{201}$, $R^{202}$ and $R^{203}$ each independently represents an organic group, and any two of $R^{201}$-$R^{203}$ may bind to each other to form a ring; $R^{204}$ and $R^{205}$ each independently represents an aryl group, an alkyl group or a cycloalkyl group; and $X^-$ represents $BF_4^-$, $PF_6^-$, $SbF_6^-$ or $(C_6H_5)_4B^-$, and (c) a basic compound that becomes less basic by irradiation with a radiation ray represented by one of the following formulae (I)-(III):

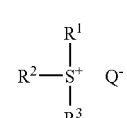
(I)

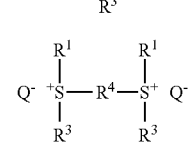
(II)

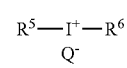
(III)

wherein, $R^1$ to $R^3$ and $R^5$ and $R^6$ each independently represents an alkyl, cycloalkyl, aralkyl, or aryl group that may be substituted; and $R^4$ represents an alkylene, cycloalkylene, or arylene group that may be substituted; $Q^-$ represents $OH^-$, an aliphatic carboxylate anion, or an aromatic carboxylate anion; and any two of $R^1$ to $R^3$ in Formula (I), $R^1$ and $R^3$ in Formula (II), or $R^5$ and $R^6$ in Formula (III) may bond with each other to form a ring, the ink composition further comprising an alicyclic epoxide;

wherein the ink composition comprises a cationically polymerizable component containing 40-55 wt % of the oxetane compound and 35-50 wt % of the alicyclic epoxide.

2. The ink composition of claim 1, wherein the content of the basic compound (c) is 0.001 to 10 wt % based on the total solid content of the ink composition.

3. The ink composition of claim 1, wherein the content of the compound (b) that generates acid by irradiation with a radiation ray is 0.1 to 20 wt % based on the total solid content of the ink composition.

4. The ink composition of claim 1, wherein the content of the cationically polymerizable compound (a) is 10 to 95 wt % based on the total solid content of the ink composition.

5. The ink composition of claim 1, further comprising a colorant (d).

6. The ink composition of claim 5, wherein the colorant (d) is a pigment or oil soluble dye.

7. The ink composition of claim 1, wherein the ink composition is for use in inkjet recording.

8. An inkjet recording method, comprising: printing on a recording medium with the ink composition of claim 1 by an inkjet printer, and hardening the printed ink composition by irradiation with a radiation ray.

9. A printed material formed by printing on a recording medium with the ink composition of claim 1 by an inkjet printer and then hardening the ink composition by irradiation with a radiation ray.

10. A method of producing a planographic printing plate, comprising: ejecting the ink composition of claim 1 onto a hydrophilic support, and hardening the ink composition by irradiation with a radiation ray, to thereby form a hydrophobic region thereon.

11. A planographic printing plate, comprising a hydrophobic region formed by ejecting the ink composition of claim 1 onto a hydrophilic support and hardening the ink by irradiation with a radiation ray.

12. The ink composition of claim 1, wherein the cationically polymerizable oxetane compound is represented by formula (I).

13. The ink composition of claim 1, wherein Q⁻ in formula (I), (II), or (III) is OH⁻.

14. The ink composition of claim 1, further comprising a sensitizer.

15. An ink composition comprising (a) a cationically polymerizable oxetane compound represented by one of the following formulae (1)-(5):

(1)

(2)

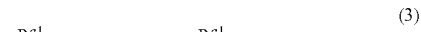
(3)

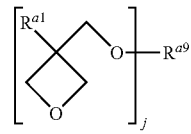
(4)

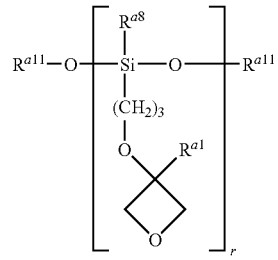
(5)

wherein $R^{a1}$ represents a hydrogen atom, an alkyl group having 1 to 6 carbon atoms, a fluoroalkyl group having 1 to 6 carbon atoms, an allyl group, an aryl group, a furyl group or a thienyl group, provided that when there are two $R^{a1}$ groups in the molecule, they may be the same as or different from each other;

$R^{a2}$ represents a hydrogen atom, an alkyl group having 1 to 6 carbon atoms, an alkenyl group having 2 to 6 carbon atoms, an aromatic ring-containing group, an alkylcarbonyl group having 2 to 6 carbon atoms, an alkoxycarbonyl group having 2 to 6 carbon atoms, or an N-alkylcarbamoyl group having 2 to 6 carbon atoms;

$R^{a3}$ represents a linear or branched alkylene group, a linear or branched poly(alkyleneoxy) group, a linear or branched unsaturated hydrocarbon group, a carbonyl group or a carbonyl group-containing alkylene group, a carboxyl group-containing alkylene group, a carbamoyl group-containing alkylene group, or one of the following groups:

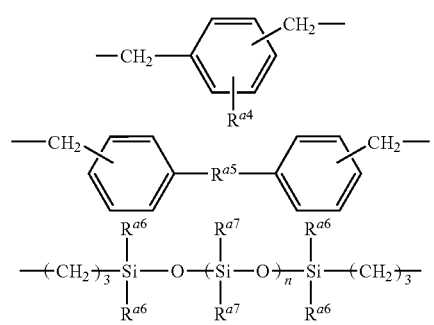

wherein $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkylcarboxyl group, a carboxyl group, or a carbamoyl group;

$R^{a5}$ represents an oxygen or sulfur atom, a methylene group, NH, SO, $SO_2$, $C(CF_3)_2$, or $C(CH_3)_2$;

$R^{a6}$ represents an alkyl group having 1 to 4 carbon atoms or an aryl group;

n is an integer of 0 to 2,000;

$R^{a7}$ represents an alkyl group having 1 to 4 carbon atoms, an aryl group, or a monovalent group having the following structure:

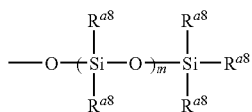

wherein $R^{a8}$ represents an alkyl group having 1 to 4 carbon atoms or an aryl group;
m is an integer of 0 to 100;
$R^{a9}$ represents a connecting group;
j is 3 or 4;
$R^{a11}$ represents an alkyl group having 1 to 4 carbon atoms or a trialkylsilyl group; and
r is 1 to 4,
(b) a compound that generates an acid upon irradiation with a radiation ray represented by one of the following formulae (b1) and (b2):

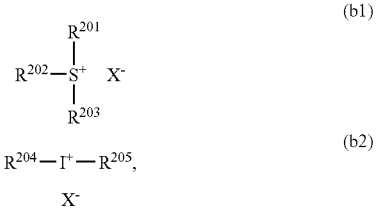

wherein $R^{201}$, $R^{202}$ and $R^{203}$ each independently represents an organic group, and any two of $R^{201}$-$R^{203}$ may bind to each other to form a ring; $R^{204}$ and $R^{205}$ each independently represents an aryl group, an alkyl group or a cycloalkyl group; and $X^-$ represents $BF_4^-$, $PF_6^-$, $SbF_6^-$ or $(C_6H_5)_4B^-$, and
(c) a basic compound that becomes less basic by irradiation with a radiation ray represented by one of the following formulae (I)-(III):

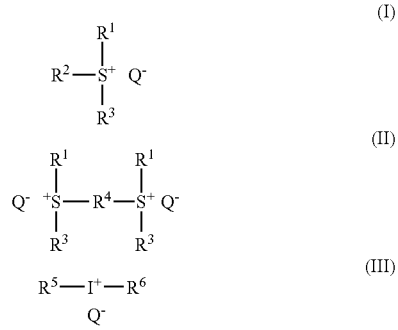

wherein, $R^1$ to $R^3$ and $R^5$ and $R^6$ each independently represents an alkyl, cycloalkyl, aralkyl, or aryl group that may be substituted; and $R^4$ represents an alkylene, cycloalkylene, or arylene group that may be substituted; $Q^-$ represents $OH^-$, an aliphatic carboxylate anion, or an aromatic carboxylate anion; and any two of $R^1$ to $R^3$ in Formula (I), $R^1$ and $R^3$ in Formula (II), or $R^5$ and $R^6$ in Formula (III) may bond with each other to form a ring, the ink composition further comprising an alicyclic epoxide;
wherein the ink composition comprises a cationically polymerizable component containing 35-40 wt % of the oxetane compound and 50-55 wt % of the alicyclic epoxide.

16. The ink composition of claim 15, wherein the content of the basic compound (c) is 0.001 to 10 wt % based on the total solid content of the ink composition.

17. The ink composition of claim 15, wherein the content of the compound (b) that generates acid by irradiation with a radiation ray is 0.1 to 20 wt % based on the total solid content of the ink composition.

18. The ink composition of claim 15, wherein the content of the cationically polymerizable compound (a) is 10 to 95 wt % based on the total solid content of the ink composition.

19. The ink composition of claim 15, further comprising a colorant (d).

20. The ink composition of claim 19, wherein the colorant (d) is a pigment or oil soluble dye.

21. The ink composition of claim 15, wherein the ink composition is for use in inkjet recording.

22. The ink composition of claim 15, wherein the cationically polymerizable oxetane compound is represented by formula (I).

23. The ink composition of claim 15, wherein $Q^-$ in formula (I), (II), or (III) is $OH^-$.

24. The ink composition of claim 15, further comprising a sensitizer.

25. An inkjet recording method, comprising: printing on a recording medium with the ink composition of claim 15 by an inkjet printer, and hardening the printed ink composition by irradiation with a radiation ray.

26. A printed material formed by printing on a recording medium with the ink composition of claim 15 by an inkjet printer and then hardening the ink composition by irradiation with a radiation ray.

27. A method of producing a planographic printing plate, comprising: ejecting the ink composition of claim 15 onto a hydrophilic support, and hardening the ink composition by irradiation with a radiation ray, to thereby form a hydrophobic region thereon.

28. A planographic printing plate, comprising a hydrophobic region formed by ejecting the ink composition of claim 15 onto a hydrophilic support and hardening the ink by irradiation with a radiation ray.

* * * * *